US012119017B2

(12) United States Patent
Takahashi et al.

(10) Patent No.: US 12,119,017 B2
(45) Date of Patent: Oct. 15, 2024

(54) INFORMATION PROCESSING DEVICE, INFORMATION PROCESSING SYSTEM AND INFORMATION PROCESSING METHOD

(71) Applicant: SONY GROUP CORPORATION, Tokyo (JP)

(72) Inventors: Akira Takahashi, Tokyo (JP); Kazuya Tateishi, Tokyo (JP); Yuichiro Koyama, Tokyo (JP); Hiroaki Ogawa, Tokyo (JP); Chie Kamada, Tokyo (JP); Noriko Totsuka, Tokyo (JP); Emiro Tsunoo, Tokyo (JP); Yuki Takeda, Tokyo (JP); Yoshinori Maeda, Tokyo (JP); Kan Kuroda, Tokyo (JP); Akira Fukui, Tokyo (JP); Hideaki Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 369 days.

(21) Appl. No.: 17/609,314

(22) PCT Filed: Mar. 25, 2020

(86) PCT No.: PCT/JP2020/013473
§ 371 (c)(1),
(2) Date: Nov. 5, 2021

(87) PCT Pub. No.: WO2020/230460
PCT Pub. Date: Nov. 19, 2020

(65) Prior Publication Data

US 2022/0223167 A1 Jul. 14, 2022

(30) Foreign Application Priority Data

May 14, 2019 (JP) ................................ 2019-091131

(51) Int. Cl.
*G10L 21/0232* (2013.01)
*G10L 15/22* (2006.01)
(Continued)

(52) U.S. Cl.
CPC .......... *G10L 21/0232* (2013.01); *G10L 15/22* (2013.01); *G10L 15/30* (2013.01);
(Continued)

(58) Field of Classification Search
CPC ......... G10L 15/20; G10L 15/22; G10L 25/84; G10L 2015/223; G10L 21/0232;
(Continued)

(56) References Cited

U.S. PATENT DOCUMENTS 9,640,179 B1 * 5/2017 Hart .................... G10L 21/0208
9,794,710 B1 * 10/2017 Sheen ..................... H04S 7/305
(Continued)

FOREIGN PATENT DOCUMENTS

EP 3644315 A1 * 4/2020 ......... G10L 21/0232

*Primary Examiner* — Mohammad K Islam
(74) *Attorney, Agent, or Firm* — CHIP LAW GROUP

(57) ABSTRACT

Provided is a device that includes a user spoken voice extraction unit that extracts a user spoken voice from a microphone input sound. The user spoken voice extraction unit analyzes a sound source direction of an input sound, determines whether the input sound includes an external apparatus output sound on the basis of sound source directions of external apparatus output sounds recorded in a database, and removes a sound signal corresponding to a feature amount, for example, a frequency characteristic of the external apparatus output sound recorded in the database, from the input sound to extract a user spoken voice from which the external apparatus output sound has been removed upon determining that the input sound includes the external apparatus output sound.

13 Claims, 17 Drawing Sheets

32 RADIO RECEIVER
LIVING ROOM ENVIRONMENT
33 REFRIGERATOR
DINING TABLE
31 TELEVISION SET
KITCHEN
34 RICE COOKER
LOW TABLE
1 USER
SOFA
11 MICROPHONE (ARRAY)
10 INFORMATION PROCESSING DEVICE

(51) Int. Cl.

| | |
|---|---|
| ***G10L 15/30*** | (2013.01) |
| ***G10L 21/0216*** | (2013.01) |
| ***H04R 1/40*** | (2006.01) |
| ***H04R 3/00*** | (2006.01) |

(52) U.S. Cl.
CPC ............. *H04R 1/406* (2013.01); *H04R 3/005* (2013.01); *G10L 2021/02166* (2013.01)

(58) Field of Classification Search
CPC ........... G10L 15/30; G10L 2021/02166; G06F 3/165; H04R 1/406; H04R 3/005
See application file for complete search history.

(56) References Cited

U.S. PATENT DOCUMENTS

| | | | | |
|---|---|---|---|---|
| 2017/0150255 | A1* | 5/2017 | Wang | H04R 29/005 |
| 2018/0165055 | A1* | 6/2018 | Yu | H04S 7/307 |
| 2019/0182607 | A1* | 6/2019 | Pedersen | H04R 25/554 |
| 2020/0074995 | A1* | 3/2020 | Rosenberg | G10L 21/0216 |
| 2020/0177994 | A1* | 6/2020 | Davis | H04R 3/005 |
| 2020/0265860 | A1* | 8/2020 | Mouncer | H04R 5/04 |
| 2020/0357374 | A1* | 11/2020 | Verweij | G10K 11/17885 |
| 2020/0367006 | A1* | 11/2020 | Beckhardt | H04R 1/26 |
| 2020/0374269 | A1* | 11/2020 | Lidman | H04L 63/10 |
| 2020/0402490 | A1* | 12/2020 | Duthaler | H04R 1/406 |

* cited by examiner

Fig. 3

EXTERNAL APPARATUS OUTPUT SOUND CHARACTERISTIC DB

| (a) EXTERNAL APPARATUS ID | (b) APPARATUS TYPE | (c) SOUND SOURCE DIRECTION | (d) FEATURE AMOUNT | |
|---|---|---|---|---|
| | | | (d1) FREQUENCY CHARACTERISTICS | (d2) SPEECH TEXT |
| APPARATUS 1 | TV | dir1 | OUTPUT(dB) FREQUENCY(Hz) | — |
| APPARATUS 2 | RADIO RECEIVER | dir2 | OUTPUT(dB) FREQUENCY(Hz) | — |
| APPARATUS 3 | SMART SPEAKER | dir3 | OUTPUT(dB) FREQUENCY(Hz) | — |
| APPARATUS 4 | RICE COOKER | dir4 | | "FRESHLY COOKED RICE IS READY" |
| APPARATUS 5 | BATH | dir5 | | "THE BATH IS READY" "THE BATH WATER IS REHEATED" |
| APPARATUS 6 | ... | ... | ... | ... |
| ... | ... | ... | ... | ... |

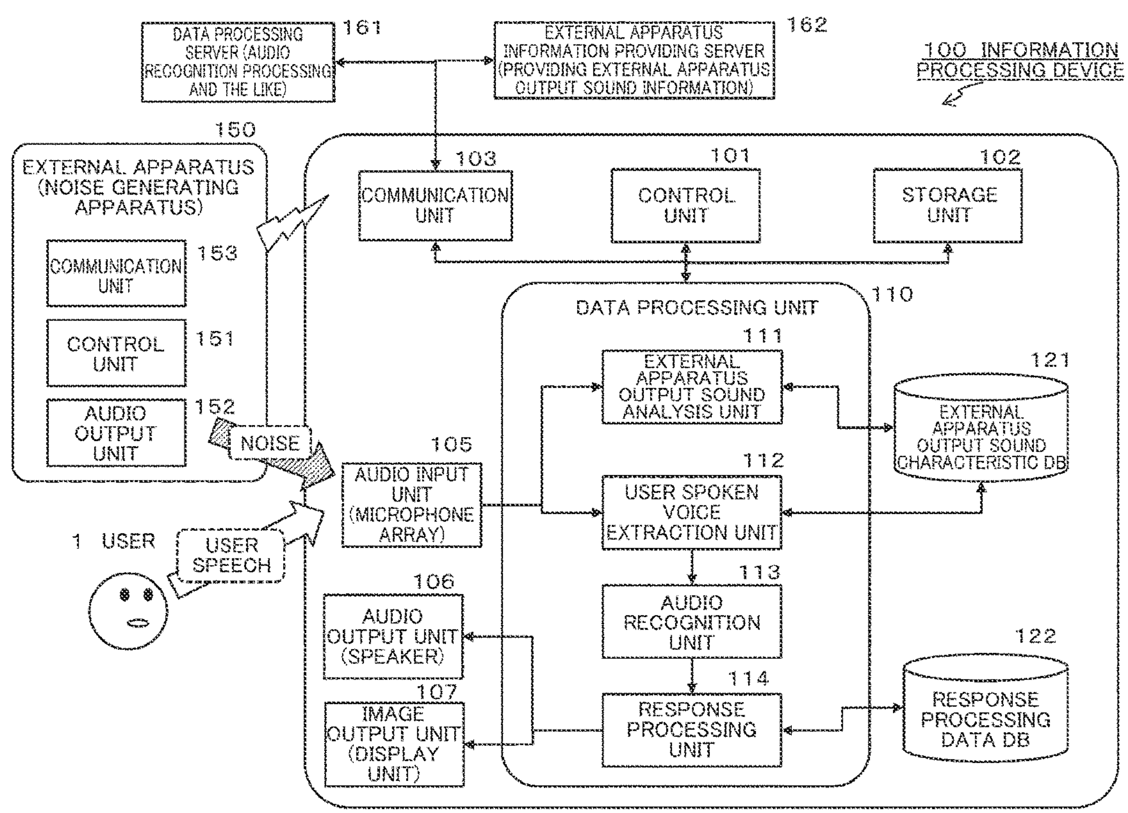
Fig. 8
DATA PROCESSING SERVER (AUDIO RECOGNITION PROCESSING AND THE LIKE)
161
EXTERNAL APPARATUS INFORMATION PROVIDING SERVER (PROVIDING EXTERNAL APPARATUS OUTPUT SOUND INFORMATION)
162
100 INFORMATION PROCESSING DEVICE
150
EXTERNAL APPARATUS (NOISE GENERATING APPARATUS)
COMMUNICATION UNIT
153
CONTROL UNIT
151
AUDIO OUTPUT UNIT
152
NOISE
103
COMMUNICATION UNIT
101
CONTROL UNIT
102
STORAGE UNIT
110
DATA PROCESSING UNIT
111
EXTERNAL APPARATUS OUTPUT SOUND ANALYSIS UNIT
121
EXTERNAL APPARATUS OUTPUT SOUND CHARACTERISTIC DB
105
AUDIO INPUT UNIT (MICROPHONE ARRAY)
112
USER SPOKEN VOICE EXTRACTION UNIT
1 USER
USER SPEECH
106
AUDIO OUTPUT UNIT (SPEAKER)
113
AUDIO RECOGNITION UNIT
122
107
IMAGE OUTPUT UNIT (DISPLAY UNIT)
114
RESPONSE PROCESSING UNIT
RESPONSE PROCESSING DATA DB

INFORMATION PROCESSING DEVICE, INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2020/013473 filed on Mar. 25, 2020, which claims priority benefit of Japanese Patent Application No. JP 2019-091131 filed in the Japan Patent Office on May 14, 2019. Each of the above-referenced applications is hereby incorporated herein by reference in its entirety.

TECHNICAL FIELD

The present disclosure relates to an information processing device, an information processing system, an information processing method, and a program. More specifically, the present disclosure relates to an information processing device, an information processing system, an information processing method, and a program for executing processing and response depending on user speech.

BACKGROUND ART

Recently, voice interactive systems that perform audio recognition of user speech and execute various types of processing and responses based on recognition results have been increasingly used. Such voice interactive systems are called, for example, a smart speaker, an agent, an agent apparatus, and the like. Such voice interactive systems analyze user speech input through a microphone and perform processing depending on analysis results.

For example, when a user says, "Tell me tomorrow's weather", weather information is acquired from a weather information providing server, a system response based on the acquired information is generated, and the generated response is output through a speaker. Specifically, for example, following system speech is output. system speech="It will be clear tomorrow. But there may be a thunderstorm in the evening."

Voice interactive systems have a serious problem that it is difficult to distinguish whether a sound input through a microphone of a system is a voice of a user talking to the system or sound and noise output from a device and the like other than the user, such as a television set, a radio receiver, and an air-conditioner.

When a system recognizes sound other than a voice of a user talking to the system as user speech and performs processing, erroneous processing is likely to be performed. Such an erroneous operation of the system may be called, for example, "gushing".

As a conventional technology, PTL 1 (JP 2017-090789 A) discloses a configuration for preventing such an erroneous operation.

PTL 1 discloses a method of audio-recognizing an audio signal including a voice of a speaker to acquire a first audio recognition result, audio-recognizing an audio signal including, for example, an audio signal and the like of television broadcasting and the like acquired through an additional sound collecting means to acquire a second audio recognition result, extracting common data from these two audio recognition results, and extracting only speech of the speaker included in the first audio recognition result by removing the common data from the first audio recognition result including the voice of the speaker.

However, according to the method disclosed in PTL 1, complicated processing of individually executing audio recognition processing on a plurality of audio signals, analyzing and extracting common parts of the two audio recognition results, and finally subtracting the common parts from the first audio recognition result needs to be performed, and thus it has problems that a processing load and a processing time of a data processing unit such as an audio recognition engine in the system increase, that is, processing cost increases.

CITATION LIST

Patent Literature

[PTL 1]
JP 2017-090789 A

SUMMARY

Technical Problem

The present disclosure has been devised in view of the above-described circumstances and an objective of the present disclosure is to provide an information processing device, an information processing system, an information processing method, and a program capable of distinguishing user speech from noise other than the user speech and performing processing only on the user speech.

An embodiment of the present disclosure provides an information processing device, an information processing system, an information processing method, and a program capable of registering a feature amount of audio output from an apparatus such as a television set, distinguished as noise other than user speech, in a database (DB) and removing the noise from sound input to a system using the registered information to acquire clear user speech.

Solution to Problem

A first aspect of the present disclosure is an information processing device including a user spoken voice extraction unit configured to extract a user spoken voice from a sound input through an audio input unit, wherein the user spoken voice extraction unit analyzes a sound source direction of the input sound and executes processing of determining whether the input sound includes an external apparatus output sound on the basis of sound source directions of external apparatus output sounds recorded in an external apparatus output sound characteristic database and removing the external apparatus output sound from the input sound using a feature amount of the external apparatus output sound recorded in the external apparatus output sound characteristic database when it is determined that the input sound includes the external apparatus output sound.

Furthermore, a second aspect of the present disclosure is an information processing device including an external apparatus output sound analysis unit configured to analyze a characteristic of an output sound of an external apparatus and to record the analyzed characteristic in a database, wherein the external apparatus output sound analysis unit causes audio data having a known frequency characteristic to be output from the external apparatus, receives a sound signal acquired by a microphone array, and executes analysis of the input sound signal to analyze a sound source direction of the external apparatus and a frequency characteristic of the external apparatus output sound.

Furthermore, a third aspect of the present disclosure is an information processing method executed in an information processing device, wherein the information processing device includes a user spoken voice extraction unit configured to extract a user spoken voice from a sound input through an audio input unit, and wherein the user spoken voice extraction unit analyzes a sound source direction of the input sound and executes processing of determining whether the input sound includes an external apparatus output sound on the basis of sound source directions of external apparatus output sounds recorded in an external apparatus output sound characteristic database and removing the external apparatus output sound from the input sound using a feature amount of the external apparatus output sound recorded in the external apparatus output sound characteristic database when it is determined that the input sound includes the external apparatus output sound.

Furthermore, a fourth aspect of the present disclosure is an information processing method executed in an information processing device, wherein the information processing device includes an external apparatus output sound of an external apparatus and to record the analyzed characteristic in a database, and wherein the external apparatus output sound analysis unit causes audio data having a known frequency characteristic to be output from the external apparatus, receives a sound signal acquired by a microphone array, and executes analysis of the input sound signal to analyze a sound source direction of the external apparatus and a frequency characteristic of the external apparatus output sound.

Furthermore, a fifth aspect of the present disclosure is a program causing information processing to be executed in an information processing device, wherein the information processing device includes a user spoken voice extraction unit configured to extract a user spoken voice from a sound input through an audio input unit, and wherein the program causes the user spoken voice extraction unit to analyze a sound source direction of the input sound, and to execute processing of determining whether the input sound includes an external apparatus output sound on the basis of sound source directions of external apparatus output sounds recorded in an external apparatus output sound characteristic database and removing the external apparatus output sound from the input sound using a feature amount of the external apparatus output sound recorded in the external apparatus output sound characteristic database when it is determined that the input sound includes the external apparatus output sound.

Furthermore, a sixth aspect of the present disclosure is a program causing information processing to be executed in an information processing device, wherein the information processing device includes an external apparatus output sound analysis unit configured to analyze a characteristic of an output sound of an external apparatus and to record the analyzed characteristic in a database, and wherein the program causes the external apparatus output sound analysis unit to cause audio data having a known frequency characteristic to be output from the external apparatus, to receive a sound signal acquired by a microphone array, and to execute analysis of the input sound signal to analyze a sound source direction of the external apparatus and a frequency characteristic of the external apparatus output sound.

Meanwhile, the program of the present disclosure may be, for example, a program that can be provided through a storage medium and a communication medium that provide the program in a computer-readable format to an information processing device and a computer system capable of executing various program codes. By providing such a program in a computer-readable format, processing according to the program is realized in the information processing device and the computer system.

Other objects, features, and advantages of the present disclosure will become clear according to detailed description based on embodiments of the present disclosure which will be described later and the attached drawings. Note that, in the present description, a system is a logical set of a plurality of devices, and it does not matter whether or not devices of respective configurations are arranged in a single housing.

According to a configuration of an embodiment of the present disclosure, a device and a method capable of performing audio recognition based on clear user speech by removing an external apparatus output sound from audio input through an audio input unit are realized.

Specifically, for example, a user spoken voice extraction unit that extracts a user spoken voice from a microphone input sound is included. The user spoken voice extraction unit analyzes a sound source direction of an input sound, determines whether the input sound includes an external apparatus output sound on the basis of sound source directions of external apparatus output sounds recorded in a database, and removes a sound signal corresponding to a feature amount, for example, a frequency characteristic of the external apparatus output sound recorded in the database, from the input sound to extract a user spoken voice from which the external apparatus output sound has been removed upon determining that the input sound includes the external apparatus output sound.

According to this configuration, a device and a method capable of performing audio recognition based on clear user speech by removing an external apparatus output sound from audio input through an audio input unit are realized.

Meanwhile, the advantageous effects described in the present description are merely exemplary and are not limiting, and other additional advantageous effects may be obtained.

BRIEF DESCRIPTION OF DRAWINGS

FIG. 3 is a diagram illustrating an example of data stored in an external apparatus output sound characteristic database generated and used by an information processing device of the present disclosure.

FIG. 8 is a diagram illustrating a specific configuration example of the information processing device of the present disclosure.

DESCRIPTION OF EMBODIMENTS

Figure 1:
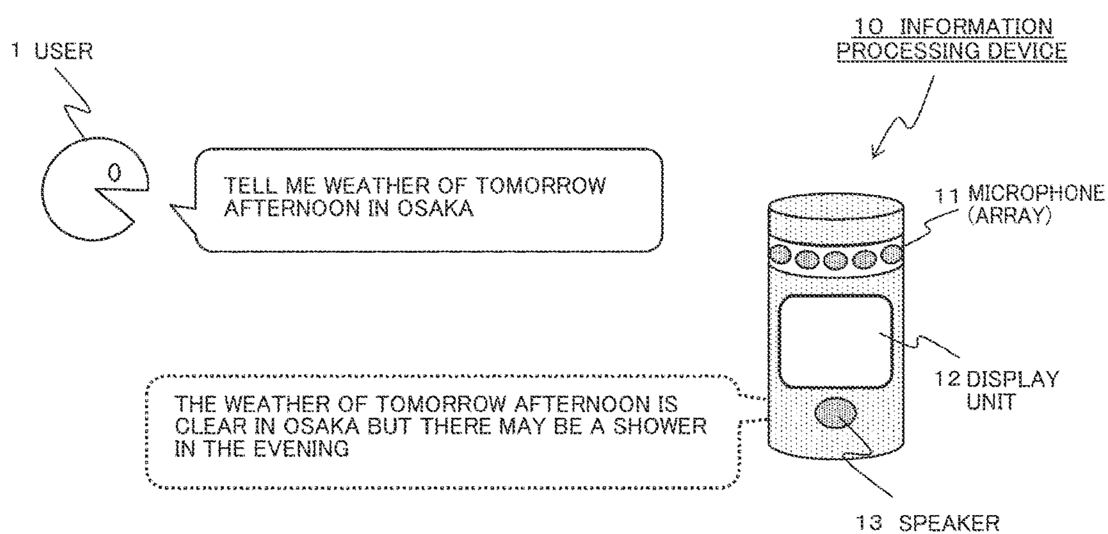
FIG. 1 is a diagram illustrating an example of a voice interactive system that performs response and processing based on user speech.

Hereinafter, an information processing device, an information processing system, an information processing method, and a program of the present disclosure will be described in detail with reference to the accompanying drawings. The description will be given in the following order.

1. Overview and problems of voice interactive system
2. External apparatus output sound characteristic database generated and used by information processing device of the present disclosure
3. Configuration example of information processing device of the present disclosure
4. Details of processing executed by external apparatus output sound analysis unit
5. Embodiment in which external apparatus output sound analysis unit performs frequency characteristic analysis processing on input sound in units of microphone of microphone array without executing beam forming processing
6. Details of processing executed by user spoken voice extraction unit
7. Hardware configuration example of information processing device
8. Summary of configuration of present disclosure 1. Overview and Problems of Voice Interactive System First, an overview and problems of a voice interactive system will be described with reference to FIG. 1.

FIG. 1 is a diagram illustrating a processing example of an information processing device 10 that recognizes speech of a user 1 and performs response thereto.

The information processing device 10 may execute audio recognition processing on user speech, for example, user speech="Tell me the weather for tomorrow afternoon in Osaka".

Further, the information processing device 10 executes processing based on an audio recognition result of the user speech.

In the example illustrated in FIG. 1, data for responding to user speech="Tell me the weather for tomorrow afternoon in Osaka" is acquired, a response is generated on the basis of the acquired data, and the generated response is output through a speaker 13.

In the example illustrated in FIG. 1, the information processing device 10 performs the following system response.

System response="The weather will be clear tomorrow afternoon in Osaka, but there may be showers in the evening."

The information processing device 10 executes text-to-speech (TTS) processing to generate the aforementioned system response and outputs the system response.

The information processing device 10 generates a response using knowledge data acquired from a storage unit in the device or knowledge data acquired through a network and outputs the response.

The information processing device 10 illustrated in FIG. 1 includes a microphone (array) 11, a display unit 12, and the speaker 13 and has a configuration through which audio input/output and image input/output can be performed.

The information processing device 10 illustrated in FIG. 1 may be called, for example, a smart speaker or an agent apparatus.

Meanwhile, audio recognition processing and semantic analysis processing for user speech may be performed in the information processing device 10 or executed in a server of a cloud side.

The microphone (array) 11 includes a plurality of microphones disposed at different positions in order to identify a sound source direction.

When the plurality of microphones disposed at different positions acquire a sound from a sound source in a specific direction, time of arrival of the sound from the sound source with respect to each microphone of the microphone array 11 slightly varies. That is, each microphone receives a sound signal having a phase difference in a sound source direction. This phase difference depends on a sound source direction, and thus a sound source direction can be obtained by analyzing a phase difference of an audio signal acquired by each microphone.

The information processing device 10 recognizes speech of a user 1 and performs response based on the user speech.

Meanwhile, the information processing device 10 may be connected to a server through a network and acquire information necessary to generate a response to user speech from the server. In addition, a configuration in which the server performs audio recognition processing and semantic analysis processing, as described above, may be employed.

However, various noises are present in an environment in which the information processing device 10 that performs voice interaction is actually used. An example of an environment in which the information processing device 10 is actually used is illustrated in FIG. 2.

Figure 2:
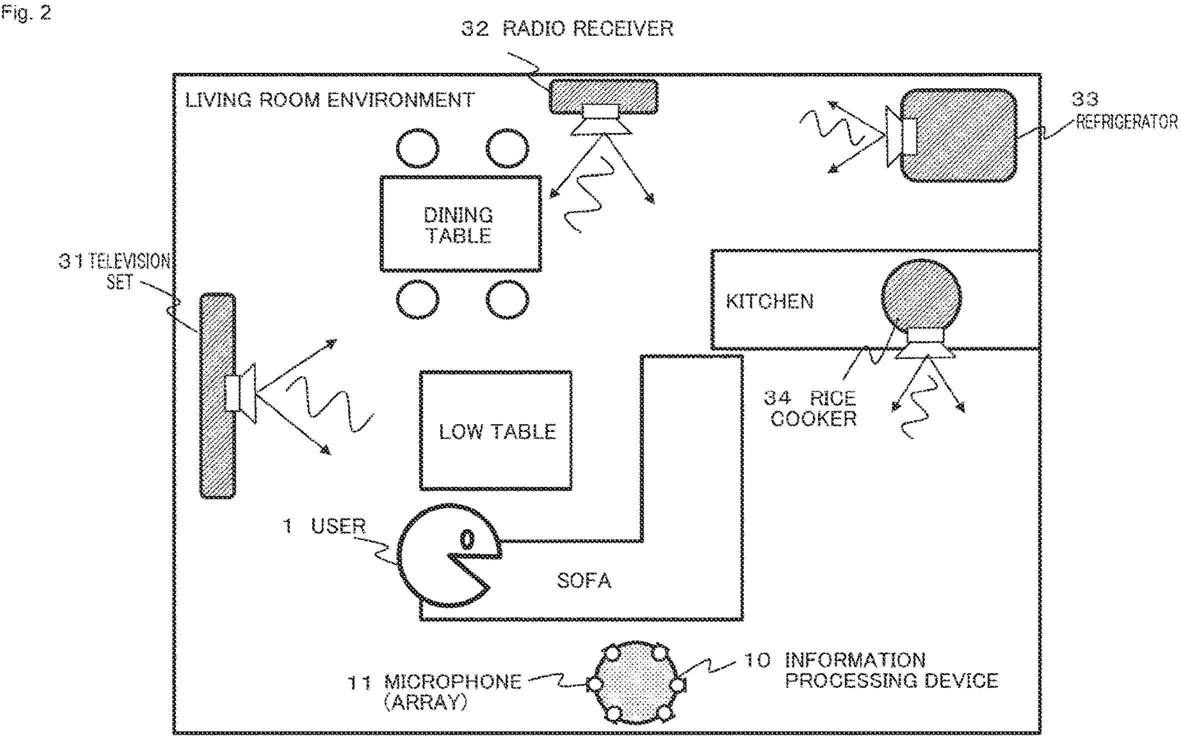
FIG. 2 is a diagram illustrating an example of an installation environment of an information processing device.

As illustrated in FIG. 2, external apparatuses such as a television set 31, a radio receiver 32, a refrigerator 33, and a rice cooker 34 are present around the information processing device 10 that performs voice interaction. These external apparatuses output various sounds when they operate.

For example, if the television set 31 and the radio receiver 32 switch on, audio of various programs is output. Such audio of the television set 31 and the radio receiver 32 becomes noise with respect to user speech.

In addition, recent refrigerators 33, rice cookers 34, and the like also have an audio output function in many cases. For example, a voice "the door is open" may be output from the refrigerator 33. In addition, a voice "freshly cooked rice is ready" may be output from the rice cooker 34.

Further, constant noise sound is generated even when external apparatuses such as an air conditioner and a ventilator operate in addition to the apparatuses illustrated in FIG. 2.

The information processing device 10 also receives noise output from such various external apparatuses along with user speech through the microphones.

As a result, the information processing device 10 cannot correctly execute audio recognition processing on the user speech and thus is highly likely to execute processing different from the intention of the user speech, generating an error (gushing).

The information processing device of the present disclosure realizes error reduction by removing or reducing noise from sound input through microphones to extract a clear user spoken voice and performing audio recognition.

As a countermeasure for avoiding such errors due to gushing, the following method may be conceived.

(1) Only a voice-like speech section is selected. For example, an audio section detection is performed according to voice activity detection (VAD) to distinguish voice from noise.

(2) When a user speaks, specific speech of "starting word" is obtained.

(3) A difference between sound pressures of a background noise and user speech is detected.

(4) Noise sound output from an apparatus corresponding to a noise source and having a fixed sound source direction is registered, and this registered noise data is removed from input sound of the information processing device 10 to extract user speech.

Although the aforementioned plurality of countermeasures (1) to (4), for example, are conceivable, the countermeasure (1) has a problem that noise cannot be distinguished from user speech even if detection according to VAD is executed when a noise source is an apparatus outputting the same sound as human voice, such as a television set or a radio receiver.

The starting word of (2) has a problem that a user is forced to repeated say the starting word and thus the user burden grows.

Processing of distinguishing a background noise from user speech according to a sound pressure difference therebetween in (3) has a problem that a background noise cannot be clearly distinguished from user speech in a case where a speaker of a television set, a radio receiver, or the like is set at a position close to microphones, a case where a user is separated from microphones, and the like, and thus a possibility of mis-determination increases.

The configuration of (4) in which registered noise data is removed from an input sound of the information processing device 10 to extract user speech is estimated to be effective for an apparatus constantly outputting noise, for example, an apparatus such as an air conditioner. However, apparatuses such as a television set and a radio receiver do not output constant noise and thus the effects according to this processing are unlikely to be obtained.

The information processing device of the present disclosure solves such problems and realizes error reduction by removing or reducing noise that is output sound from various external apparatuses, included in microphone input sound of the information processing device 10, to extract a clear user spoken voice and performing audio recognition.

2. External Apparatus Output Sound Characteristic Database Generated and Used by Information Processing Device of the Present Disclosure Next, an external apparatus output sound characteristic database generated and used to extract user speech by the information processing device of the present disclosure will be described.

The information processing device of the present disclosure removes or reduces external apparatus output sound from a microphone input sound to select and extract a clear user spoken voice and executes response processing on user speech when the microphone input sound of the information processing device includes various external apparatus output sounds other than user speech.

To realize this processing, the information processing device of the present disclosure generates a database (DB) in which characteristic information of output sounds of external apparatuses is recorded in advance. This database is called an "external apparatus output sound characteristic database (DB)".

FIG. 3 illustrates a data configuration example of the "external apparatus output sound characteristic database (DB)".

As illustrated in FIG. 3, the external apparatus output sound characteristic DB is a database in which the following data is recorded in association with external apparatuses such as a television set and a radio receiver.

(a) External apparatus ID (b) Apparatus type (c) Sound source direction (d) Feature amount Further, at least one of (d1) frequency characteristic and (d2) speech text is recorded in the feature amount.

For example, an identifier of an external apparatus placed in a living room where the information processing device 10 illustrated in FIG. 2 is placed may be recorded in (a) external apparatus ID.

A type of an external apparatus, for example, an apparatus type of a TV set, a radio receiver, or the like, may be recorded in (b) apparatus type.

With respect to (c) sound source direction and (d) feature amount, information acquired according to characteristic measurement processing executed on an external apparatus output sound by the information processing device 10 or input information of a user is recorded.

(c) Sound source direction can be determined by analyzing sound acquired by each microphone constituting the microphone array included in the information processing device 10.

Further, at least one of (d1) frequency characteristic and (d2) speech text is recorded in (d) feature amount, as described above.

(d1) Frequency characteristic may be, for example, information in which a frequency (Hz) and output intensity (dB) of an external apparatus output sound are associated with each other.

A frequency characteristic of an external apparatus output sound can be acquired according to characteristic measurement processing executed on the external apparatus output sound by the information processing device 10. Details of this processing will be described later.

(d2) Speech text may be, for example, speech text such as "freshly cooked rice is ready" output from a speaker of a rice cooker.

This speech text information may be registered according to user input, or a configuration in which text information analyzed according to audio recognition processing of the information processing device 10 is registered may be employed.

Meanwhile, in a living environment as illustrated in FIG. 2, for example, sound waves output from an external apparatus such as a television set are sound waves in which direct waves directly input from the external apparatus to the information processing device 10 and reflected waves reflected by a wall and the like and input thereto are mixed.

Figure 4:
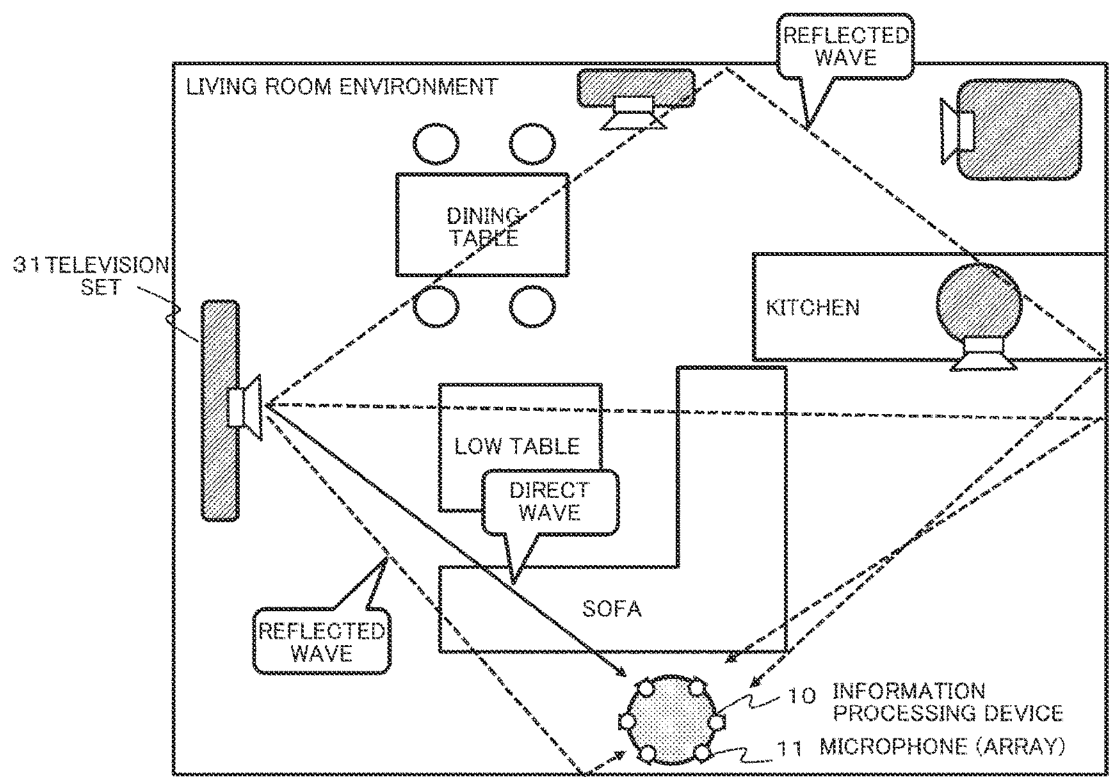
FIG. 4 is a diagram illustrating an example of input of a sound output from an external apparatus to an information processing device.

Specifically, sound waves output from the television set 31 that is an external apparatus, for example, may be input to the information processing device 10 as a single direct wave and a plurality of reflected waves, as illustrated in FIG. 4.

The information processing device 10 receives a signal in which such sound waves are mixed through microphones constituting the microphone array 11. A data processing unit of the information processing device 10 estimates a direction in which a direct wave component arrives, that is, a sound source direction of an external apparatus, for example, using a direction of arrival (DOA) estimation technique and records the estimated direction in a database.

Specifically, it is possible to determine a sound source direction according to a conventional DS method or MUSIC method using the microphone array 11, for example.

Furthermore, beam forming processing that is signal processing of selecting and emphasizing a sound in an estimated sound source direction of an external apparatus is executed to selectively acquire a sound from the sound source direction, and a frequency characteristic of the selected sound is analyzed. The analyzed frequency characteristic information of the external apparatus output sound is recorded in the database.

Meanwhile, at the time of measuring such characteristics of an external apparatus output sound, that is, a sound source direction and a feature amount such as a frequency characteristic, a sound source (reproduced audio file) prepared in advance is used and this sound source (reproduced audio file) is caused to be output through a speaker of an external apparatus such as a television set that is a measurement target.

Figure 5:
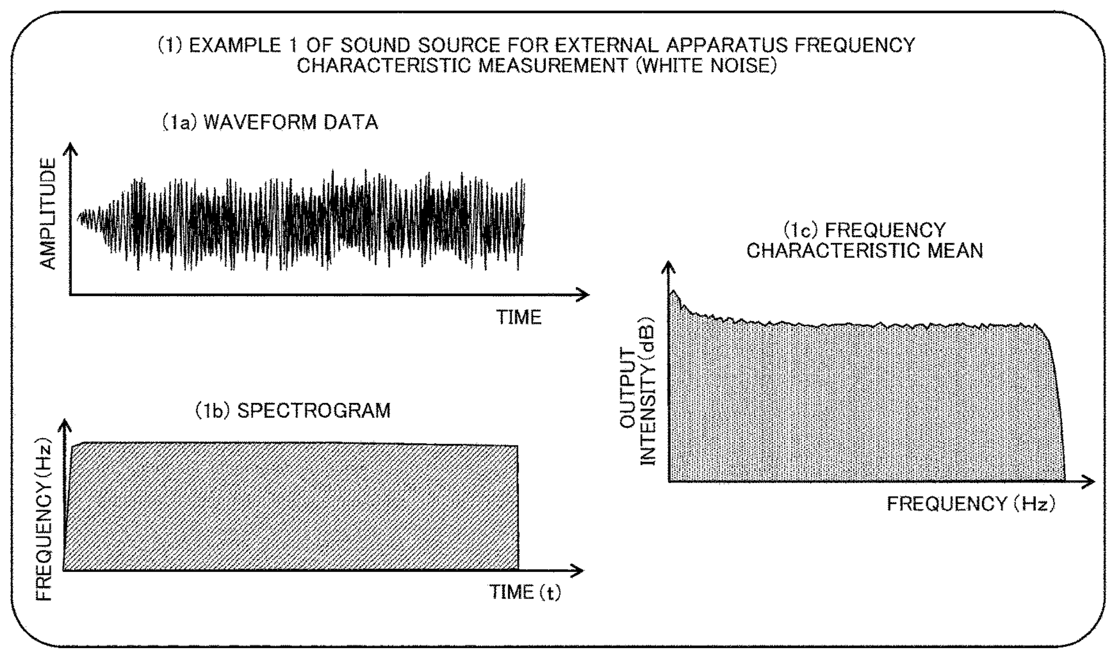
FIG. 5 is a diagram illustrating a specific example of a sound source (reproduced audio file) used at the time of measuring a sound source direction of an external apparatus output sound and feature amounts such as frequency characteristics.
Figure 6:
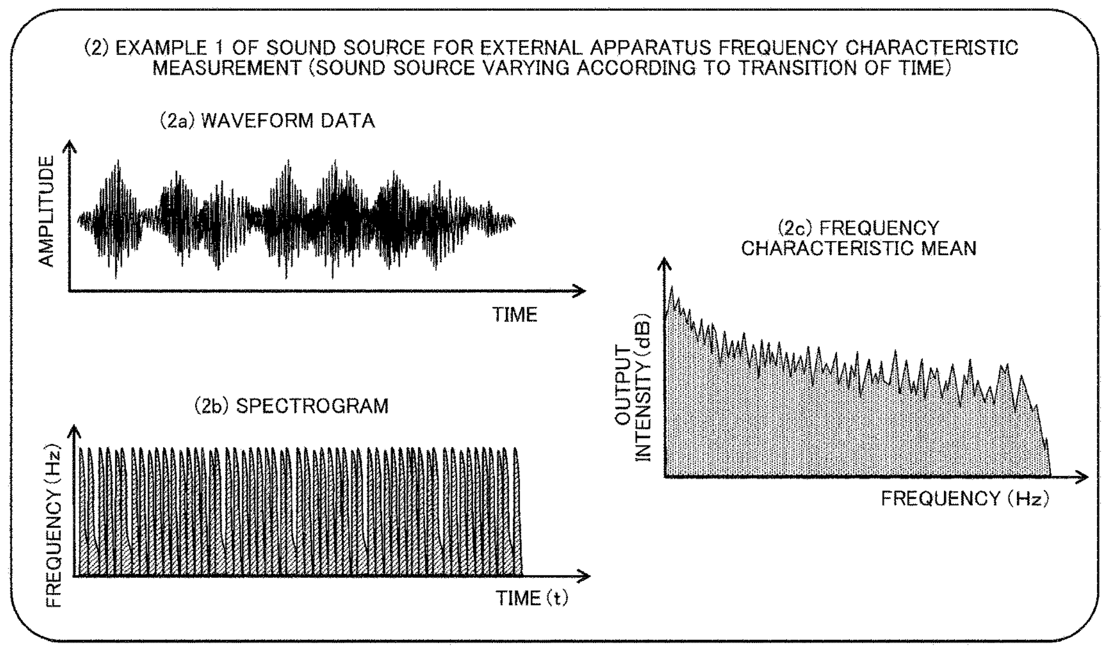
FIG. 6 is a diagram illustrating a specific example of a sound source (reproduced audio file) used at the time of measuring a sound source direction of an external apparatus output sound and feature amounts such as frequency characteristics.

A specific example of a sound source (reproduced audio file) used at the time of measuring a sound source direction and a feature amount such as a frequency characteristic of an external apparatus output sound is illustrated in FIG. 5 and FIG. 6.

FIG. 5 shows white noise evenly including sounds of the entire frequency band of an audible range.

FIG. 5 illustrates the following data of the white noise.

(1a) Waveform data (1b) Spectrogram (1c) Frequency characteristic mean data

Such white noise is caused to be output through a speaker of an external apparatus and acquired through the microphone array 11 of the information processing device 10 to measure characteristics of an external apparatus output sound, that is, a sound source direction and a feature amount such as a frequency characteristic.

A sound source (reproduced audio file) used at the time of measuring a sound source direction and a feature amount such as a frequency characteristic of an external apparatus output sound is not limited to such white noise and may be a sound source having frequency characteristics varying according to transition of time, as illustrated in FIG. 6.

However, the data processing unit of the information processing device 10 holds characteristic information of the sound source (reproduced audio file) to be used and compares characteristics of this sound source (reproduced audio file) with characteristics of an input sound from the microphone array 11 to analyze a sound source direction and a feature amount such as a frequency characteristic of the external apparatus output sound.

Figure 7:
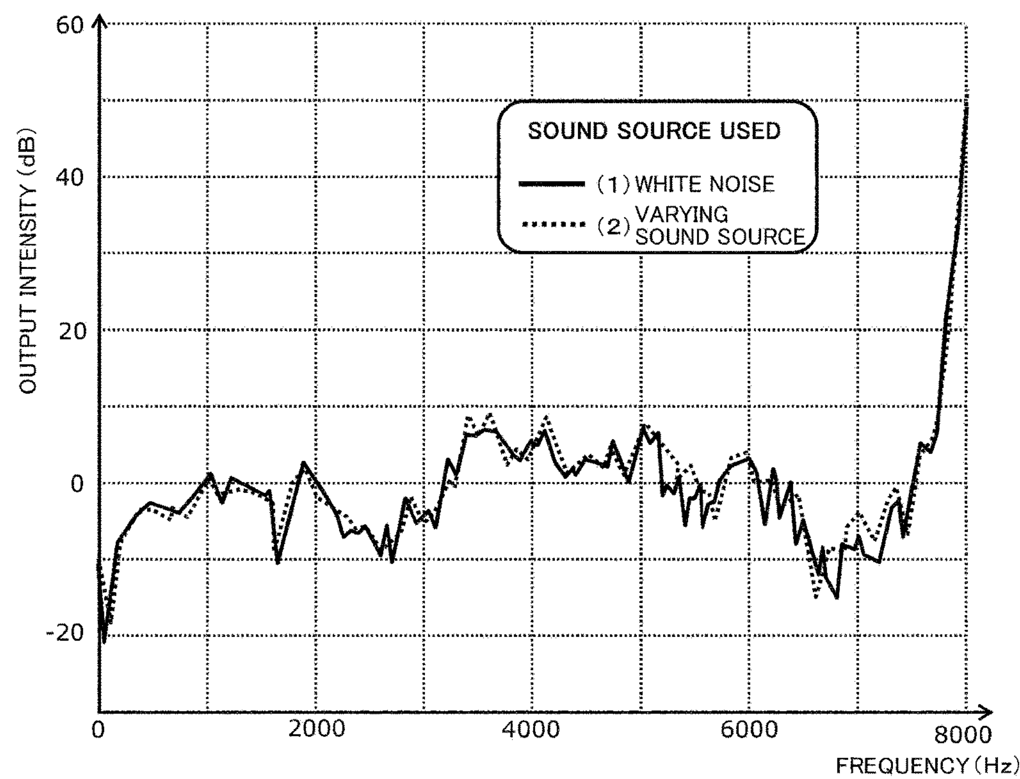
FIG. 7 is a graph showing an example of an analysis result of a frequency characteristic of an external apparatus output sound according to a data processing unit of the information processing device.

FIG. 7 is a graph showing an example of results of analysis of a frequency characteristic of an external apparatus output sound, performed by the data processing unit of the information processing device 10.

The horizontal axis represents frequency (Hz) and the vertical axis represents intensity (dB).

The graph shows two lines. A solid line represents a frequency characteristic measurement result when the white noise described with reference to FIG. 5 is used as a sound source (reproduced audio file).

A dotted line represents a frequency characteristic measurement result when the sound source described with reference to FIG. 6, that is, the sound source having frequency characteristics varying according to transition of time, is used as a sound source (reproduced audio file).

In both cases in which the sound sources are used, almost the same analysis results are obtained.

Meanwhile, when audio feature amounts of a room, a concert hall, and the like are measured, for example, an impulse response is generally measured in many cases. As an impulse response measurement method, the following two methods are known.

(1) Processing using time stretched pulse (TSP)

(2) Processing using an M length sequence

However, in the configuration of the present disclosure, frequency characteristics of the microphone array 11 of the information processing device 10 are known and a sound source (reproduced audio file) having known frequency characteristics is output through a speaker of an external apparatus, and thus the data processing unit of the information processing device 10 analyzes characteristics of an output sound of each external apparatus by using the known information. That is, characteristics of an output sound of each external apparatus are measured without performing the aforementioned impulse response measurement.

If characteristics of microphones are known and characteristics of a sound source (reproduced audio file) are also known, characteristics of an output sound of each external apparatus, that is, a sound source direction, a frequency characteristic, and the like can be analyzed even if an exact indoor impulse response is not known.

The information processing device 10 of the present disclosure executes beam forming processing, which is signal processing of selecting and emphasizing a sound in an estimated sound source direction of an external apparatus, to selectively acquire a sound from a sound source direction and analyzes a frequency characteristic of the sound.

A frequency characteristic of an external apparatus acquired through this analysis processing may be, for example, an external apparatus frequency characteristic represented according to intensity characteristic (dB) information corresponding to a frequency (Hz), and the like by the following formula.

External apparatus frequency characteristic=(frequency characteristics of observation signals acquired by the microphone array11)−(frequency characteristics of sound source(reproduced audio file))

Here, an analyzed external apparatus frequency characteristic becomes a frequency characteristic including the influence of a transfer characteristic of, for example, a living room where an external apparatus and the information processing device 10 are placed.

The analyzed frequency characteristic information of the external apparatus output sound is recorded in the database.

3. Configuration Example of Information Processing Device of the Present Disclosure Next, a specific configuration example of an information processing device of the present disclosure will be described with reference to FIG. 8.

FIG. 8 is a diagram illustrating a configuration example of an information processing device 100 that recognizes user speech and performs processing and response corresponding to the user speech. The information processing device 100 illustrated in FIG. 8 corresponds to the above-described information processing device 10 illustrated in FIG. 1 and other figures.

As illustrated in FIG. 8, the information processing device 100 includes a control unit 101, a storage unit 102, a communication unit 103, an audio input unit (microphone array) 105, an audio output unit (speaker) 106, an image output unit (display unit) 107, a data processing unit 110, an external apparatus output sound DB 121, and a response processing data DB 122.

Further, the data processing unit 110 includes an external apparatus output sound analysis unit 111, a user spoken voice extraction unit 112, an audio recognition unit 113, and a response processing unit 114.

Further, FIG. 8 also illustrates a single external apparatus 150. The external apparatus 150 is, for example, any of the television set 31, the radio receiver 32, the refrigerator 33, and the like described above with reference to FIG. 2. The external apparatus 150 includes a control unit 151, an audio output unit 152, and a communication unit 153.

Meanwhile, a plurality of external apparatuses may be present in addition to the single external apparatus illustrated in the figure.

The communication unit 103 of the information processing device 100 executes communication with the external apparatus 150 or other external apparatuses and additionally executes communication with an external server, for example, a data processing server 161 and an external apparatus information providing server 162 illustrated in the figure.

The data processing server 161 may execute, for example, audio recognition processing. As described above, audio recognition processing may be executed in the information processing device 100, but it may be executed in an external server. When audio recognition processing is not executed in the information processing device 100, the audio recognition processing unit 113 in the data processing unit 110 of the information processing device 100 illustrated in the figure may be omitted. In this case, the information processing device 100 requests audio recognition processing from the data processing server 161 through the communication unit 103, receives an audio recognition result from the data processing server 161, inputs the audio recognition result to the response processing unit 114, and performs response to a user 1.

The external apparatus information providing server 162 is a server that provides information about output sounds of external apparatuses.

For example, the external apparatus information providing server 162 may provide, for example, audio text information output from a rice cooker, specifically, audio text information, such as "freshly cooked rice is ready", output from an external apparatus, and the like to the information processing device 100.

The control unit 101 of the information processing device 100 registers this information in the external apparatus output sound characteristic DB 121. That is, the control unit 101 registers the information as (d2) speech text information of (d) feature amount of the external apparatus output sound characteristic DB 121 described above with reference to FIG. 3.

Meanwhile, processing of registering speech text of an external apparatus in a database may be executed by a user, as described above, or executed using an audio recognition result in the audio recognition unit 113 of the data processing unit 110 of the information processing device 100.

Processing executed by each component of the information processing device 100 will be described.

The control unit 101 comprehensively controls various types of processing executed in the information processing device 100. For example, the control unit 101 comprehensively controls various types of processing executed in the information processing device 100, for example, external apparatus output sound characteristic analysis processing, user speech analysis processing, response generation processing, and the like.

Such processing can be executed, for example, according to programs stored in the storage unit 102.

The control unit 101 includes a processor such as a CPU having a program execution function.

The storage unit 102 stores parameters and the like applied to various types of processing in addition to programs executed by the control unit 101. For example, the storage unit 102 also stores sound sources (reproduced audio files) to be used for external apparatus output sound characteristic analysis, which have been described above with reference to FIG. 5 and FIG. 6. Further, the storage unit 102 is also used as a recording area of audio information input through the audio input unit (microphone) 105.

The communication unit 103 executes communication with the external apparatus 150 and external servers.

The external apparatus 150 may be, for example, a television set (TV), a radio receiver, or the like and a noise generating apparatus that generates various external apparatus output sounds (noise).

The external apparatus 150 includes the control unit 151, the audio output unit 152, and the communication unit 153. When analysis processing is executed on an output sound of the external apparatus 150, the information processing device 100 transmits the sound source (reproduced audio file) described above with reference to FIG. 5 or FIG. 6 through the communication unit 103 and causes the sound source to be output through the audio output unit 152 of the external apparatus 150.

This output sound is input to the audio input unit (microphone array) 105 of the information processing device 100.

The acquired sound signal input to the audio input unit (microphone array) 105 is input to the external apparatus output sound analysis unit 111 of the data processing unit 110.

The external apparatus output sound analysis unit 111 executes analysis of the output sound of the external apparatus to analyze a sound source direction of the external apparatus, a frequency characteristic, and the like as feature amounts. Further, analysis results are recorded in the external apparatus output sound characteristic database 121.

That is, processing of generating and recording data to be recorded in the external apparatus output sound characteristic database 121 described above with reference to FIG. 3 is performed.

Meanwhile, details of processing executed by the external apparatus output sound analysis unit 111 will be described below.

When a user speaks, the spoken voice is also input to the audio input unit (microphone array) 105 of the information processing device 100.

The acquired sound signal input to the audio input unit (microphone array) 105 is input to the user spoken voice extraction unit 112 of the data processing unit 110.

The user spoken voice extraction unit 112 executes processing of removing or reducing output sounds of external apparatuses from the acquired sound input to the audio input unit (microphone array) 105 to extract a user spoken voice from the input sound.

In user spoken voice extraction processing in the user spoken voice extraction unit 112, information registered in the external apparatus output sound characteristic database 121 is used.

Details of processing executed by the user spoken voice extraction unit 112 will be described below.

The user spoken voice signal extracted by the user spoken voice extraction unit 112 is input to the audio recognition unit 113.

The audio recognition unit 113 receives the clear user spoken voice signal from which the output sounds of the external apparatuses have been removed or reduced and executes user spoken voice recognition processing. Specifically, audio data may be converted into text data composed of a plurality of words according to an automatic speech recognition (ASR) function, for example. Further, speech semantic analysis processing is executed on the text data. For example, the intent of the user speech and entities that are meaningful elements (significant elements) included in the speech may be estimated from the text data according to a natural language understanding function such as natural language understanding (NLU).

The response processing unit 114 acquires an audio recognition result from the audio recognition unit 113 and generates a response (system speech) to the user 1 with reference to the response processing data DB 122.

Response data generated by the response processing unit 114 is output through the audio output unit (speaker) 106 and the image output unit (display unit) 107.

4. Details of Processing Executed by External Apparatus Output Sound Analysis Unit Next, details of processing executed by the external apparatus output sound analysis unit 111 in the data processing unit 110 of the information processing device 100 will be described.

As described above, the external apparatus output sound analysis unit 111 executes analysis of an output sound of an external apparatus to analyze a sound source direction of the external apparatus, a frequency characteristic as a feature amount, and the like. Further, the analysis results are recorded in the external apparatus output sound characteristic database 121.

That is, processing of generating and recording data to be recorded in the external apparatus output sound characteristic database 121 described above with reference to FIG. 3 is performed.

A processing sequence executed by the external apparatus output sound analysis unit 111 will be described with reference to the flowchart of FIG. 9.

Figure 9:
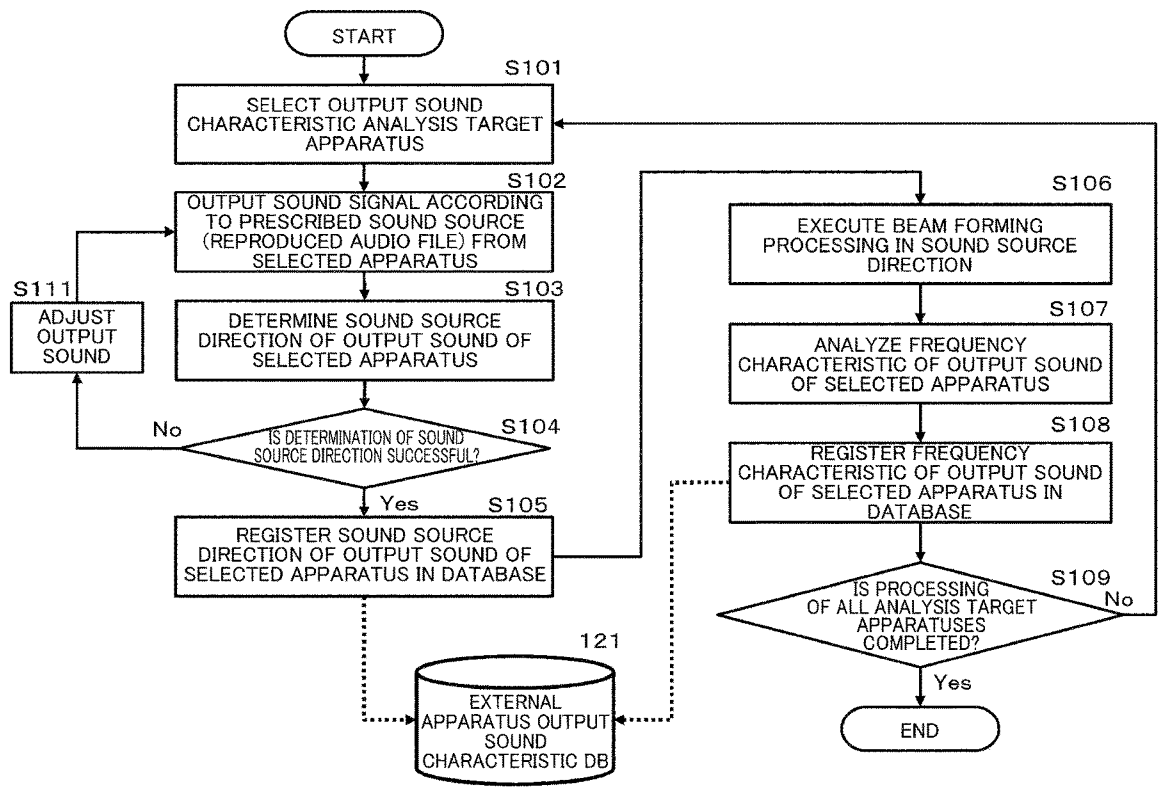
FIG. 9 is a diagram showing a flowchart illustrating an example of a processing sequence executed by the information processing device of the present disclosure.

Meanwhile, processing according to a flow represented in FIG. 9 and following may be, for example, processing executable under the control of a CPU and the like having a program execution function according to a program stored in the storage unit of the information processing device.

Processing of each step in the flow illustrated in FIG. 9 will be sequentially described.

(Step S101)

First, the information processing device 100 selects an output sound characteristic analysis target apparatus in step S101.

For example, the information processing device 100 may select a single output sound characteristic analysis target apparatus from a plurality of external apparatuses in the living room environment illustrated in FIG. 2, that is, the television set 31, the radio receiver 32, the refrigerator 33, the rice cooker 34, and the like.

(Step S102)

Next, the information processing device 100 causes a sound according to a prescribed sound source (reproduced audio file) prepared in advance to be output from the external apparatus selected in step S101.

Specifically, the information processing device 100 causes a sound according to the sound source (reproduced audio file) described above with reference to FIG. 5 or FIG. 6 to be output through a speaker of the selected external apparatus.

The information processing device 100 transmits sound source (reproduced audio file) data to the external apparatus selected as an analysis target through the communication unit 103 and causes a sound according to the transmitted sound source (reproduced audio file) to be output through the speaker of the selected external apparatus.

(Step S103)

Processing of the next step S103 and following steps is executed by the external apparatus output sound analysis unit 111 of the data processing unit 110 of the information processing device 100.

In step S102, the sound signal output from the external apparatus is input to the audio input unit (microphone array) 105 of the information processing device 100 and this input sound is input to the external apparatus output sound analysis unit 111.

First, the external apparatus output sound analysis unit 111 executes sound source direction analysis processing in step S103.

The external apparatus output sound analysis unit 111 analyzes a sound source direction of the sound output from the external apparatus, for example, using the direction of arrival (DOA) estimation technique. Specifically, the external apparatus output sound analysis unit 111 analyzes the sound source direction according to the DS method or the MUSIC method to which analysis of phase differences of input signals of microphones constituting the audio input unit (microphone array) 105, and the like are applied.

(Step S104)

The external apparatus output sound analysis unit 111 determines whether sound source direction analysis processing is successful or fails in step S104, proceeds to step S111, executes output sound adjustment, and repeats processing of step S102 and the following steps again when sound source direction analysis processing is not successful.

When it is determined that sound source direction analysis processing is successful in step S104, the processing sequence proceeds to step S105.

(Step S105)

Upon determining that sound source direction analysis processing is successful in step S104, the external apparatus output sound analysis unit 111 registers sound source direction data of the output sound of the selected apparatus in a database in step S105. That is, the external apparatus output sound analysis unit 111 records the sound source direction data in the external apparatus output sound characteristic database 121.

(Step S106)

Next, the external apparatus output sound analysis unit 111 executes beam forming processing that is signal processing of selecting and emphasizing a sound in a sound source direction of an external apparatus in step S106.

(Step S107)

Next, the external apparatus output sound analysis unit 111 analyzes a frequency characteristic of the external apparatus output sound in step S107.

Frequency characteristic data acquired by this analysis processing may be, for example, intensity (dB) information corresponding to each frequency (Hz), and the like and may be, for example, an external apparatus frequency characteristic represented by the following formula.

External apparatus frequency characteristic=(frequency characteristics of observation signals acquired by audio input unit(microphone array) 105)−(frequency characteristics of sound source (reproduced audio file))

Here, an analyzed external apparatus frequency characteristic becomes a frequency characteristic including the influence of a transfer characteristic of, for example, a living room where an external apparatus and the information processing device 100 are placed.

(Step S108)

Next, the external apparatus output sound analysis unit 111 registers the frequency characteristic of the external apparatus output sound, analyzed in step S107, in a database in step S108.

That is, the external apparatus output sound analysis unit 111 records the sound source direction data in the external apparatus output sound characteristic database 121.

(Step S109)

Finally, the external apparatus output sound analysis unit 111 determines whether analysis processing of all analysis target external apparatuses is completed in step S109. When there is an unprocessed external apparatus, the flow returns to step S101 and executes processing of step S101 and the following steps with respect to the unprocessed external apparatus.

When it is determined that analysis processing of all analysis target external apparatuses is completed in step S109, processing ends.

According to such processing, processing of registering external apparatus sound characteristic information in the external apparatus output sound characteristic database 121 described above with reference to FIG. 3 is completed.

Meanwhile, with respect to (d2) speech text among data registered in the external apparatus output sound characteristic database 121 illustrated in FIG. 3, information acquired from the external apparatus information providing server 162 may be input. In addition, (d2) speech text may be registered according to user input, or an audio recognition result of the audio recognition unit 113 of the information processing device 100 may be registered.

As described above, output sound characteristic information of an external apparatus, that is, a sound source direction of the external apparatus, a frequency characteristic as a feature amount, and the like, is recorded in the external apparatus output sound characteristic database 121 through processing executed according to the flow illustrated in FIG. 9 in the external apparatus output sound analysis unit 111 in the data processing unit 110 of the information processing device 100.

Next, a specific example of signal processing for a sound signal output from an external apparatus, executed according to the flow illustrated in FIG. 9, will be described with reference to FIG. 10.

Figure 10:
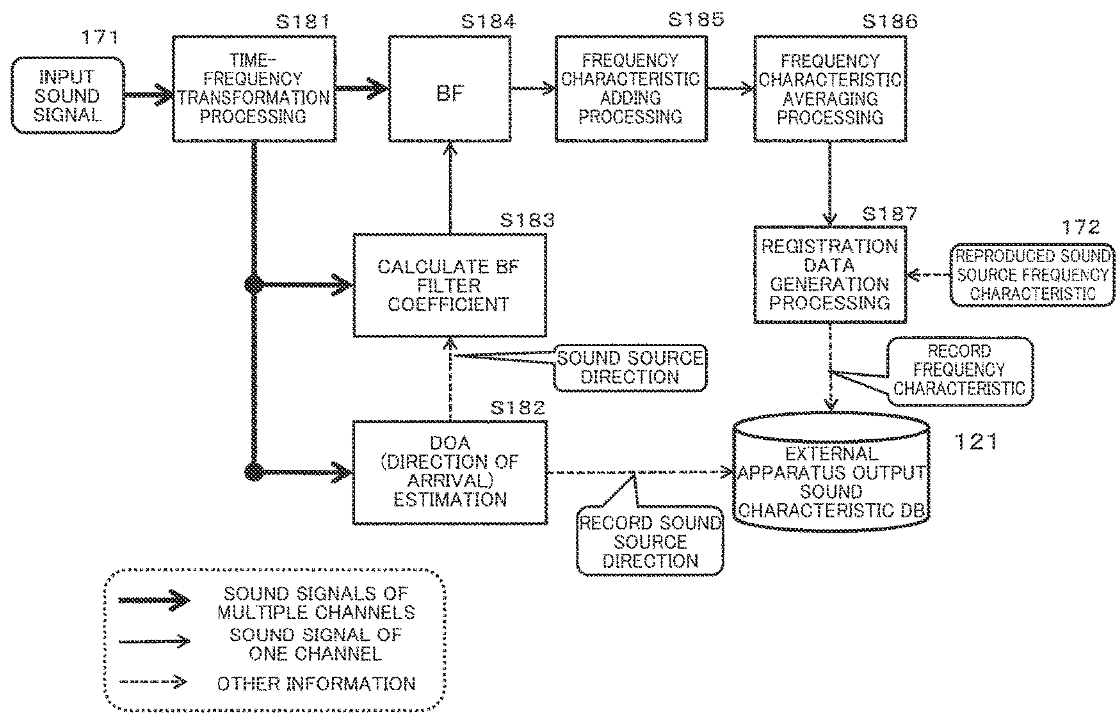
FIG. 10 is a diagram illustrating an example of a processing sequence executed by the information processing device of the present disclosure.

FIG. 10 is a diagram illustrating signal processing for an input sound signal input to the audio input unit (microphone array) 105 of the information processing device 100.

This signal processing is executed by the external apparatus output sound analysis unit 111.

First, time-frequency transformation processing is executed on an input sound signal 171 input to the audio input unit (microphone array) 105 in step S181. Time-frequency transformation data by which an amplitude of a frequency component of each time unit can be analyzed is generated according to so-called Fourier transform (FT).

Next, sound source direction estimation processing is executed using the time-frequency transformation data in step S182. An arrival direction of a direct wave component, that is, a sound source direction of an external apparatus, is calculated using the direction of arrival (DOA) estimation technique.

Next, a beam forming (BF) coefficient that is a parameter for performing beam forming (BF) processing that is signal processing of selecting and emphasizing a sound in the estimated sound source direction of the external apparatus is calculated in step S183 and beam forming (BF) processing to which the calculated coefficient has been applied is executed in step S184.

Next, processing of step S185 and the following steps is executed on an input sound from the sound source direction.

Processing of adding frequency characteristics sequentially acquired according to a processing sequence for each specific frequency is executed in step S185 and processing of averaging addition results is executed in step S186.

According to such processing, noise included in an audio signal is removed or reduced.

In step S187, external apparatus frequency characteristic data to be finally recorded in the external apparatus output sound characteristic DB 121 is calculated. Specifically, a reproduced sound source frequency characteristic 172 is acquired and an external apparatus frequency characteristic to be registered in the database is calculated according to the following formula.

External apparatus frequency characteristic=(frequency characteristics of observation signals acquired by the microphone array11)−(frequency characteristics of sound source(reproduced audio file))

Meanwhile, when the frequency characteristics of the sound source (reproduced audio file) are not flat, correction processing is performed on the frequency characteristics of the sound source as necessary.

The external apparatus frequency characteristic calculated according to the aforementioned formula becomes a frequency characteristic including the influence of a transfer characteristic of, for example, a living room where the external apparatus and the information processing device 100 are placed.

The analyzed frequency characteristic information of the external apparatus output sound is recorded in the external apparatus output sound characteristic DB 121.

5. Embodiment in which External Apparatus Output Sound Analysis Unit Performs Frequency Characteristic Analysis Processing on Input Sound in Units of Microphone of Microphone Array without Executing Beam Forming Processing Next, an embodiment in which beam forming processing is not executed and frequency characteristic analysis processing for an input sound in units of a microphone of the microphone array is performed will be described as another example of processing executed by the external apparatus output sound analysis unit 111 in the data processing unit 110 of the information processing device 100.

Figure 11:
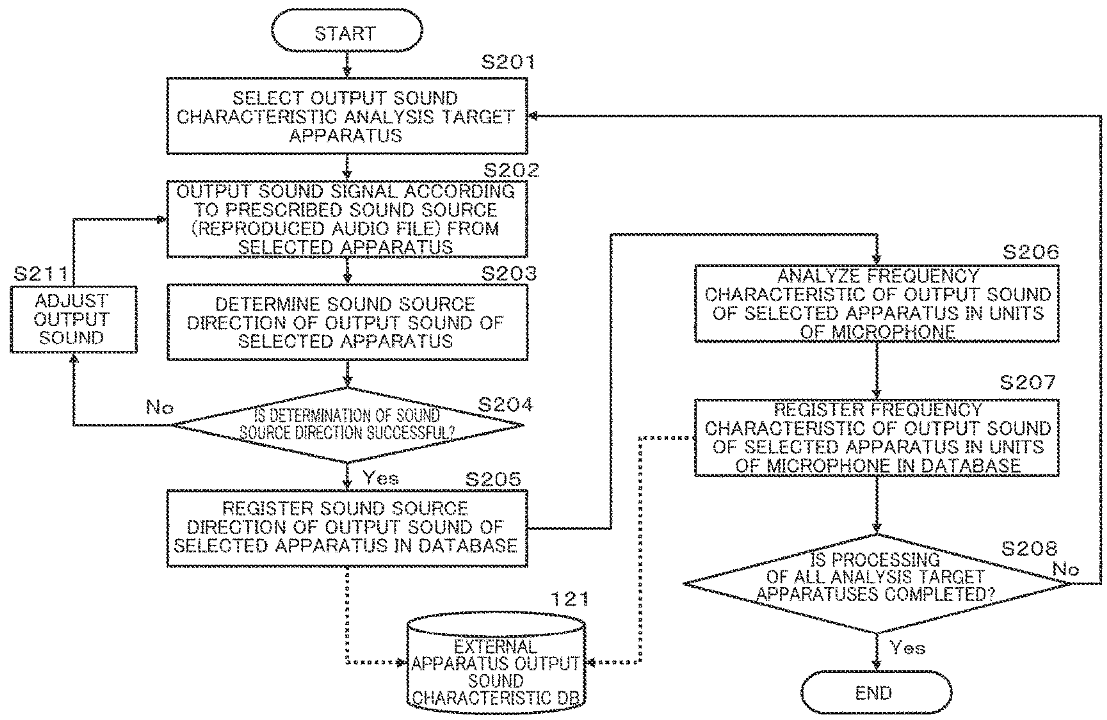
FIG. 11 is a diagram showing a flowchart illustrating an example of a processing sequence executed by the information processing device of the present disclosure.

A processing sequence executed by the external apparatus output sound analysis unit 111 according to the present embodiment will be described with reference to the flowchart of FIG. 11.

(Steps S201 to S205 and S211)

Processing of steps S201 to S205 and step S211 is the same processing as processing of steps S101 to S105 and S111 of the flow described above with reference to FIG. 9.

That is, an output sound characteristic analysis target apparatus is selected in step S201.

In step S202, a sound according to a prescribed sound source (reproduced audio file) prepared in advance is caused to be output from an external apparatus selected in step S201.

Specifically, the information processing device 100 causes a sound according to the sound source (reproduced audio file) described above with reference to FIG. 5 or FIG. 6 to be output through a speaker of the selected external apparatus.

Next, a sound source direction analysis processing is executed in step S203.

The external apparatus output sound analysis unit 111 analyzes a sound source direction of the sound output from the external apparatus, for example, using the direction of arrival (DOA) estimation technique.

It is determined whether the sound source direction analysis processing is successful or fails in step S204, and when the sound source direction analysis processing is not successful, the processing sequence proceeds to step S211, output sound adjustment is executed, and processing of step S202 and the following steps is repeated again.

When it is determined that sound source direction analysis processing is successful in step S204, the processing sequence proceeds to step S205.

Upon determining that the sound source direction analysis processing is successful in step S204, the external apparatus output sound analysis unit 111 registers sound source direction data of the output sound of the selected apparatus in a database in step S205. That is, the external apparatus output sound analysis unit 111 records sound source direction data in the external apparatus output sound characteristic database 121.

In this manner, processing of analyzing a sound source direction of an output sound of an external apparatus and processing of recording sound source direction data in the database are executed as the same processing as processing of steps S101 to S105 and S111 of the flow described above with reference to FIG. 9 in the present embodiment.

Processing of step S206 and the following steps is processing specific to the present embodiment. Hereinafter, processing of step S206 and the following steps will be described.

(Step S206)

The external apparatus output sound analysis unit 111 of the information processing device 100 analyzes frequency characteristics in units of input sound of each microphone constituting the microphone array of the audio input unit (microphone array) 105 in step S206.

Frequency characteristic data acquired according to this analysis processing is a frequency characteristic of an input sound for each microphone constituting the microphone array of the audio input unit (microphone array) 105.

For example, when the number of microphones constituting the microphone array is n, n pieces of frequency characteristic data corresponding to the number of microphones, n, are generated.

That is, the following n frequency characteristics corresponding to first to n-th microphones are acquired.

A frequency characteristic corresponding to the first microphone, which is a frequency characteristic of an external apparatus output sound corresponding to an input sound of the first microphone A frequency characteristic corresponding to the second microphone, which is a frequency characteristic of an external apparatus output sound corresponding to an input sound of the second microphone A frequency characteristic corresponding to the n-th microphone, which is a frequency characteristic of an external apparatus output sound corresponding to an input sound of the n-th microphone In this manner, the external apparatus output sound analysis unit 111 acquires the n frequency characteristics corresponding to the first to n-th microphones in step S206.

All the n external apparatus output sound frequency characteristics may be, for example, intensity (dB) information corresponding to each frequency (Hz), and an external apparatus frequency characteristic of an x-th microphone may be, for example, an external apparatus frequency characteristics calculated according to the following formula. Meanwhile, x is any value in the range of 1 to n.

External apparatus frequency characteristic corresponding to *x-th* microphone=(frequency characteristic of observation signal acquired by *x-th* microphone)−(frequency characteristic of sound source(reproduced audio file))

Here, an analyzed external apparatus frequency characteristic becomes a frequency characteristic including the influence of a transfer characteristic of, for example, a living room where an external apparatus and the information processing device 100 are placed.

(Step S207)

Next, the external apparatus output sound analysis unit 111 registers the n external apparatus output sound frequency characteristics corresponding to the n microphones, analyzed in step S206, in a database in step S207.

That is, the external apparatus output sound analysis unit 111 records sound source direction data in the external apparatus output sound characteristic database 121.

(Step S208)

Finally, the external apparatus output sound analysis unit 111 determines whether analysis processing of all analysis target external apparatuses is completed in step S208. When there is an unprocessed external apparatus, the flow returns to step S201 and executes processing of step S201 and the following steps with respect to the unprocessed external apparatus.

When it is determined that analysis processing of all analysis target external apparatuses is completed in step S208, processing ends.

According to such processing, processing of registering external apparatus sound characteristic information in the external apparatus output sound characteristic database 121 described above with reference to FIG. 3 is completed.

However, in the present embodiment, the n pieces of frequency characteristic information corresponding to the n microphones constituting the audio input unit (microphone array) 105 of the information processing device 100 are recorded in (d1) frequency characteristic of the external apparatus output sound characteristic database 121 of FIG. 3.

Next, a specific example of signal processing for a sound signal output from an external apparatus, executed according to the flow illustrated in FIG. 11, will be described with reference to FIG. 12.

Figure 12:
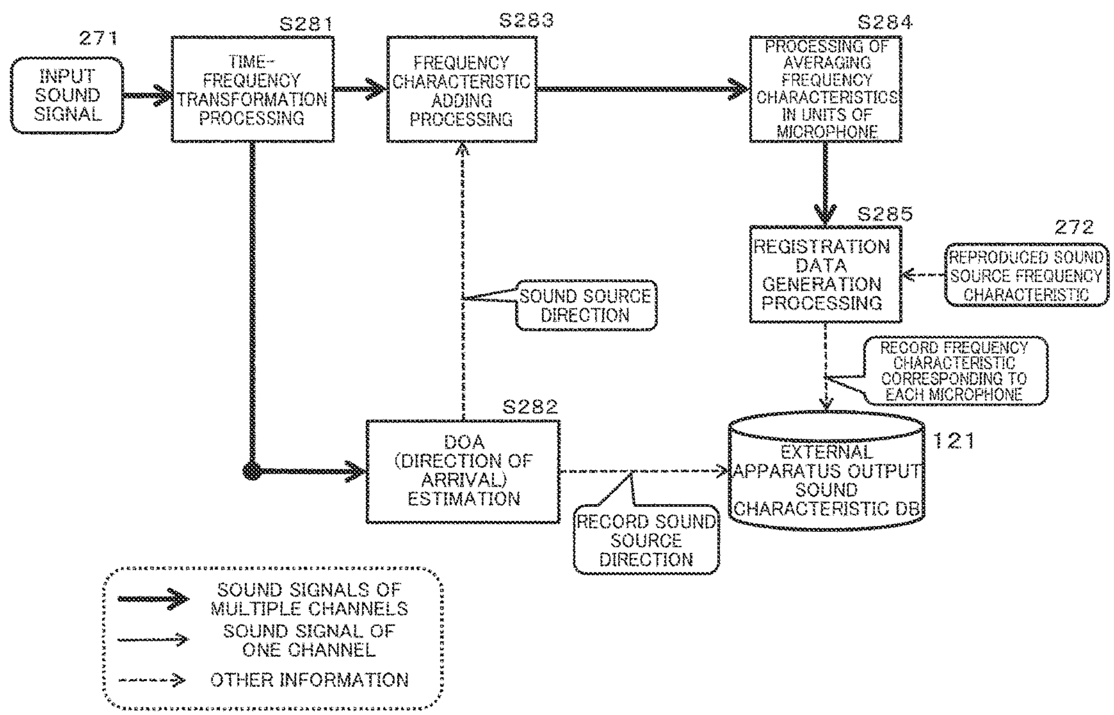
FIG. 12 is a diagram illustrating an example of a processing sequence executed by the information processing device of the present disclosure.

FIG. 12 is a diagram illustrating signal processing for an input sound signal input to the audio input unit (microphone array) 105 of the information processing device 100.

This signal processing is executed by the external apparatus output sound analysis unit 111.

First, time-frequency transformation processing is executed on an input sound signal 271 input to the audio input unit (microphone array) 105 in step S281. Time-frequency transformation data by which an amplitude of a frequency component of each time unit can be analyzed is generated according to so-called Fourier transform (FT).

Next, sound source direction estimation processing is executed using the time-frequency transformation data in step S282. An arrival direction of a direct wave component, that is, a sound source direction of an external apparatus, is calculated using the direction of arrival (DOA) estimation technique.

Next, processing of adding frequency characteristic data sequentially acquired according to a processing sequence for each specific frequency is executed in step S283 and processing of averaging addition results is executed in step S284. According to such processing, noise included in an audio signal is removed or reduced.

In step S285, the n frequency characteristics corresponding to the first to n-th microphones to be finally recorded in the external apparatus output sound characteristic DB 121 are calculated. Specifically, reproduced sound source frequency characteristics 272 are acquired and data to be recorded in the external apparatus output sound characteristic DB 121 is calculated.

For example, the external apparatus frequency characteristic of the x-th microphone becomes an external apparatus frequency characteristic calculated according to the following formula. However, x=1 to n.

External apparatus frequency characteristic corresponding to *x-th* microphone=(frequency characteristic of observation signal acquired by *x-th* microphone)−(frequency characteristic of sound source(reproduced audio file))

Meanwhile, when the frequency characteristics of the sound source (reproduced audio file) are not flat, correction processing is performed on the frequency characteristics of the sound source as necessary.

The external apparatus frequency characteristic calculated according to the aforementioned formula becomes a frequency characteristic including the influence of a transfer characteristic of, for example, a living room where the external apparatus and the information processing device 100 are placed.

The analyzed frequency characteristic information of the external apparatus output sound is recorded in the external apparatus output sound characteristic DB 121.

According to such processing, processing of registering external apparatus sound characteristic information in the external apparatus output sound characteristic database 121 described above with reference to FIG. 3 is completed.

However, in the present embodiment, the n pieces of frequency characteristic information corresponding to the n microphones constituting the audio input unit (microphone array) 105 of the information processing device 100 are recorded in (d1) frequency characteristic of the external apparatus output sound characteristic database 121 of FIG. 3.

In processing of the present embodiment, processing from which beam forming processing has been omitted becomes possible.

6. Details of Processing Executed by User Spoken Voice Extraction Unit

Next, details of processing executed by the user spoken voice extraction unit 112 of the data processing unit 110 of the information processing device 100 illustrated in FIG. 8 will be described.

As described above, the user spoken voice extraction unit 112 executes processing of removing or reducing an output sound of an external apparatus from an acquired sound input to the audio input unit (microphone array) 105 to extract a user spoken voice from the input sound.

In user spoken voice extraction processing in the user spoken voice extraction unit 112, information registered in the external apparatus output sound characteristic database 121 is used.

A processing sequence executed by the user spoken voice extraction unit 112 will be described with reference to the flowcharts of FIG. 13 and FIG. 14.

Figure 13:
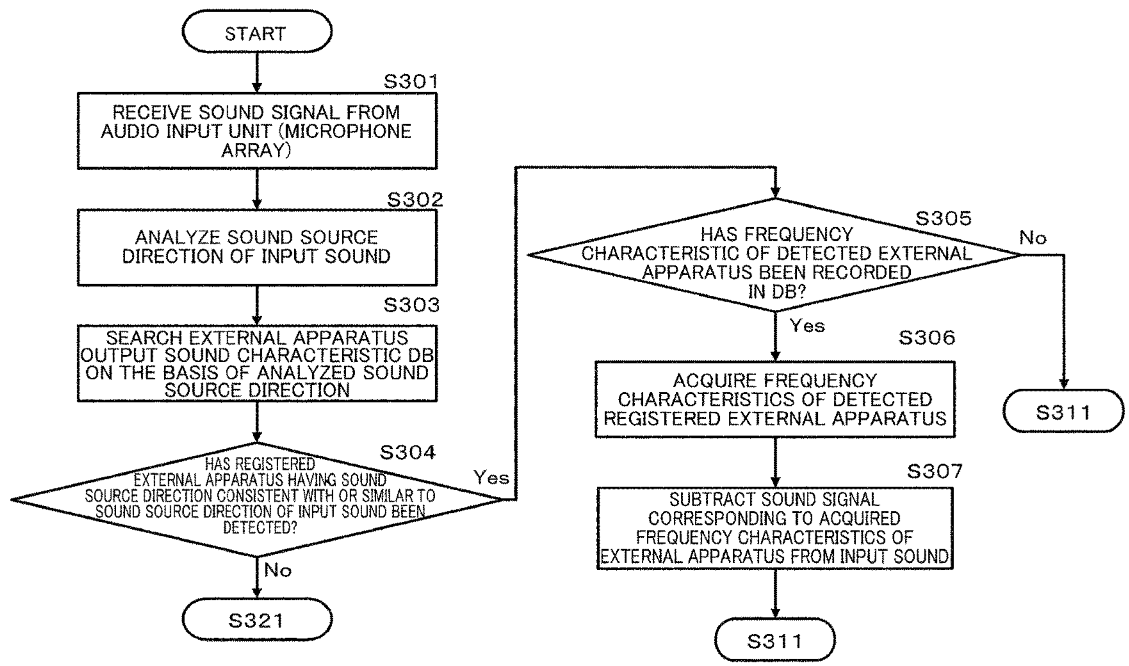
FIG. 13 is a diagram showing a flowchart illustrating an example of a processing sequence executed by the information processing device of the present disclosure.
Figure 14:
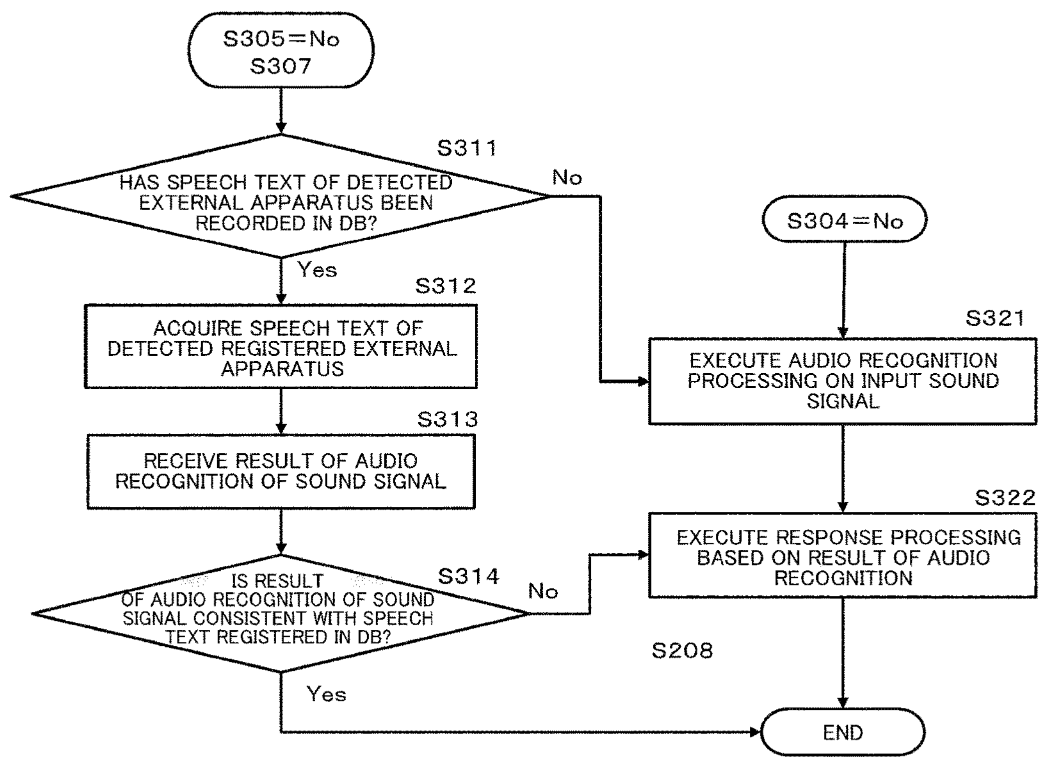
FIG. 14 is a diagram showing a flowchart illustrating an example of a processing sequence executed by the information processing device of the present disclosure.

Processing of steps of flows illustrated in FIG. 13 and FIG. 14 will be sequentially described.

(Step S301)

First, the user spoken voice extraction unit 112 of the data processing unit 110 of the information processing device 100 receives a sound signal from the audio input unit (microphone array) 105 in step S301.

(Step S302)

Next, the user spoken voice extraction unit 112 analyzes a sound source direction of the input sound in step S302. For example, the user spoken voice extraction unit 112 may calculate a sound source direction of the microphone input sound using the direction of arrival (DOA) estimation technique.

(Step S303)

Next, the user spoken voice extraction unit 112 searches the external apparatus output sound characteristic DB 121 using the sound source direction analyzed in step S302 as a search key in step S303.

(Step S304)

Next, the user spoken voice extraction unit 112 determines whether a registered external apparatus having a sound source direction that is consistent with or similar to the sound source direction analyzed in step S302 and has been recorded in the external apparatus output sound characteristic DB 121 has been detected in step S304.

When no registered external apparatus has not been detected, the processing sequence proceeds to step S321.

On the other hand, if a registered external apparatus has been detected, the processing sequence proceeds to step S305.

(Step S305)

When a registered external apparatus having a recorded sound source direction that is consistent with or similar to the sound source direction of the input sound has been detected in step S304, the user spoken voice extraction unit 112 determines whether frequency characteristic information as a feature amount of the detected registered external apparatus detected from the DB has been recorded in step S305.

When the frequency characteristic information has not been registered, the processing sequence proceeds to step S311.

When the frequency characteristic information has been registered, the processing sequence proceeds to step S306.

Meanwhile, when a plurality of registered external apparatuses having sound source directions consistent with or similar to the sound source direction analyzed in step S302 and having recorded frequency characteristics have been detected from the DB, processing of the following steps S306 and S307 is repeatedly executed for the respective external apparatuses detected from the DB.

(Step S306)

When it is determined that frequency characteristic information has been recorded as DB registered data of the registered external apparatus having a recorded sound source direction consistent with or similar to the sound source direction of the input sound in step S305, the user spoken voice extraction unit 112 acquires the frequency characteristic information of the registered external apparatus from the DB in step S306.

(Step S307)

Next, the user spoken voice extraction unit 112 executes processing of subtracting a sound signal corresponding to the frequency characteristic of the registered external apparatus, acquired from the DB, from the input sound from the audio input unit (microphone array) 105 in step S307.

After this processing, the processing sequence proceeds to step S311.

(Step S311)

When determination of step S305 is No, that is, when frequency characteristic information has not been recorded as a feature amount of the registered external apparatus detected from the DB, and after processing of step S307 is completed, that is, after processing of subtracting the sound signal corresponding to the frequency characteristic of the registered external apparatus from the input sound from the audio input unit (microphone array) 105 is executed, processing of step S311 is executed.

The user spoken voice extraction unit 112 determines whether speech text has been recorded as a feature amount of the DB registered external apparatus determined to have a sound source direction consistent with that of the input sound in step S311.

When speech text has not been recorded, the processing sequence proceeds to step S321.

On the other hand, when speech text has been recorded, the processing sequence proceeds to step S312.

(Step S312)

When it is determined that speech text has been recorded as DB registered data of the registered external apparatus having a recorded sound source direction consistent with or similar to the sound source direction of the input sound in step S311, the user spoken voice extraction unit 112 acquires the speech text recorded corresponding to the registered external apparatus from the DB in step S312.

(Step S313)

Next, the user spoken voice extraction unit 112 causes the audio recognition unit 113 to execute audio recognition processing on the input sound signal and receives a result of audio recognition in step S313.

(Step S314)

Next, the user spoken voice extraction unit 112 compares the result of audio recognition of the input sound signal with the speech text recorded corresponding to the DB registered external apparatus to determine whether they are consistent with each other in step S314.

When they are consistent with each other, the user spoken voice extraction unit 112 determines that the input sound is speech according to the external apparatus and ends processing without executing subsequent response processing.

On the other hand, when they are not consistent with each other, the user spoken voice extraction unit 112 determines that the input sound is user speech, proceeds to step S322, and executes response processing.

(Step S321)

In a case in which determination of step S304 is No, that is, a registered external apparatus having a recorded sound source direction consistent with or similar to the sound source direction of the input sound has not been detected, or a case in which determination of step S311 is No, that is, speech text has not been recorded as a feature amount of a DB registered external apparatus determined to have a sound source direction consistent with the sound source direction of the input sound, processing of steps S321 and S322 is executed.

In such cases, processing when the input sound is determined to include only user speech is executed.

In this case, audio recognition processing is executed on the input signal in step S321.

This processing is executed in the audio recognition unit 113. Alternatively, the processing may be executed in the external data processing server 161.

(Step S322)

After processing of step S321 or when determination of step S314 is No, that is, when it is determined that the result of audio recognition of the input sound signal is not consistent with the speech text recorded corresponding to the DB registered external apparatus, processing of step S322 is executed.

The information processing device 100 executes response processing based on the result of audio recognition in step S322.

This processing is executed by the response processing unit 114 of the data processing unit 110 of the information processing device 100.

This processing is executed as response processing for the user speech.

Next, a specific example of processing executed by the user spoken voice extraction unit 112 will be described with reference to FIG. 15 and FIG. 16.

Figure 15:
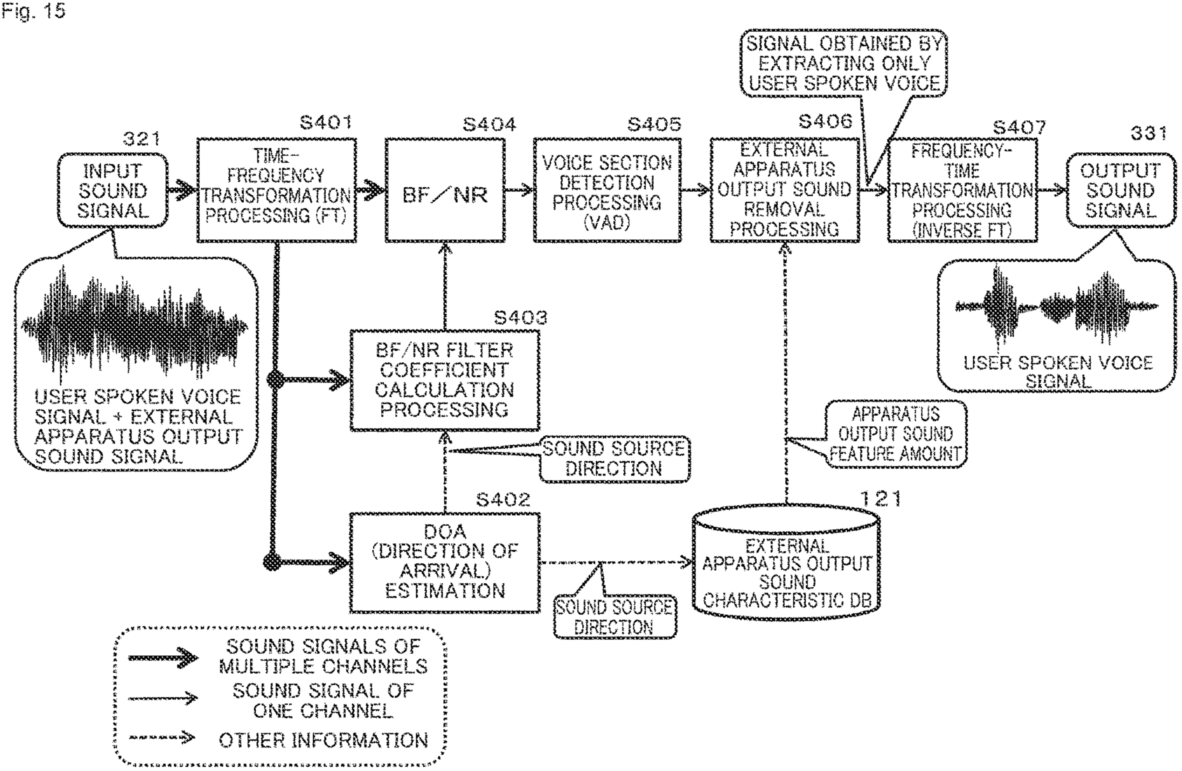
FIG. 15 is a diagram illustrating an example of a processing sequence executed by the information processing device of the present disclosure.

FIG. 15 illustrates a processing example when a user spoken voice and an output sound of an external apparatus are mixed in an input sound of the audio input unit (microphone array) 105.

Figure 16:
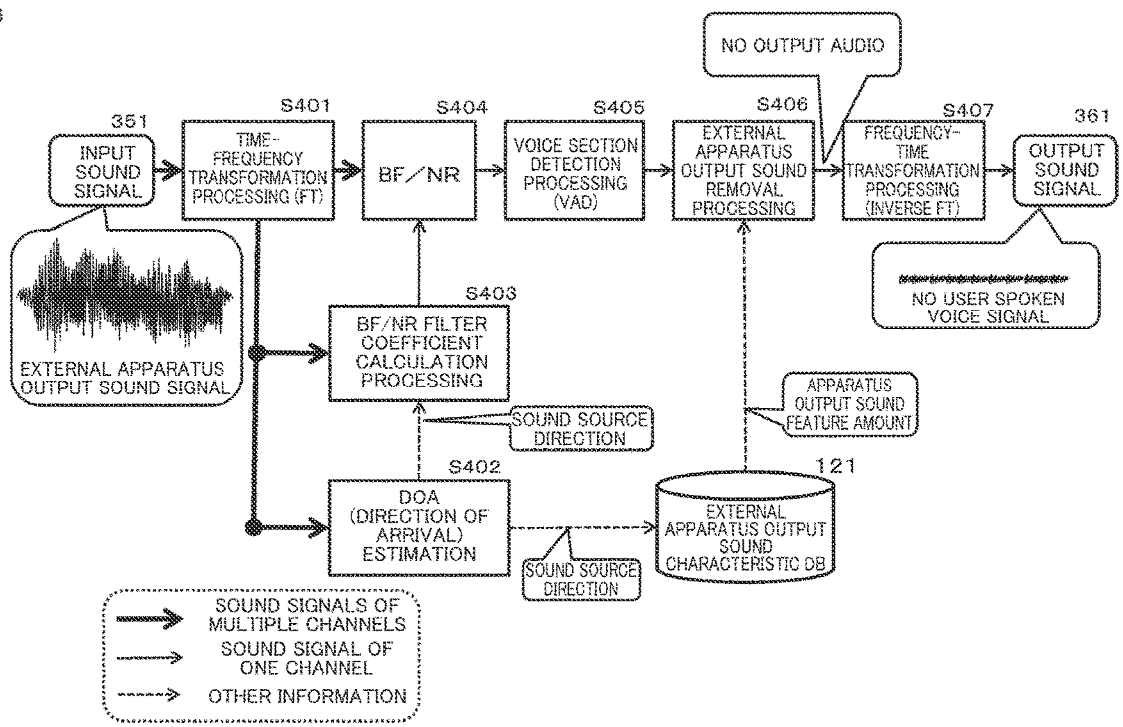
FIG. 16 is a diagram illustrating an example of a processing sequence executed by the information processing device of the present disclosure.

FIG. 16 illustrates a processing example when an input sound of the audio input unit (microphone array) 105 includes only an output sound of an external apparatus without a user spoken voice.

First, a processing example when a user spoken voice and an output sound of an external apparatus are mixed in an input sound of the audio input unit (microphone array) 105 will be described with reference to FIG. 15.

FIG. 15 is a diagram illustrating signal processing for an input sound signal input to the audio input unit (microphone array) 105 of the information processing device 100.

This signal processing is executed by the user spoken voice extraction unit 112.

First, time-frequency transformation processing is executed on an input sound signal 321 input to the audio input unit (microphone array) 105 in step S401. Time-frequency transformation data by which an amplitude of a frequency component of each time unit can be analyzed is generated according to so-called Fourier transform (FT).

Meanwhile, in the present processing example, the input sound signal 321 is a signal in which a user spoken voice and an external apparatus output sound are mixed.

Next, sound source direction estimation processing is executed using the time-frequency transformation data in step S402. A sound source direction of the microphone input sound is calculated using the direction of arrival (DOA) estimation technique.

Next, a filter coefficient that is a parameter for performing beam forming (BF) processing that is signal processing of selecting and emphasizing a sound in the estimated sound source direction and noise reduction (NR) processing is calculated in step S403, and beam forming (BF) processing and noise reduction (NR) processing to which the calculated coefficient has been applied are executed in step S404.

Next, audio section detection processing is executed on the signal after beam forming (BF) and noise reduction (NR) processing in step S405.

This audio section detection processing may be, for example, processing using the conventional Voice Actovity Detection (VAD) technique and processing of determining a section including a voice and other sections, selecting and extracting a voice section signal of only the voice section.

Next, processing of removing the external apparatus output sound is executed on the selected and extracted voice section signal in step S406.

This external apparatus output sound removal processing is executed using information registered in the external apparatus output characteristic database 121.

First, an entry of an external apparatus corresponding to the sound source direction analyzed according to the sound source direction analysis result in step S402 is selected from information corresponding to a plurality of external apparatuses registered in the external apparatus output characteristic database 121. Further, a feature amount of the selected entry, for example, frequency characteristic information is acquired.

In step S406, processing of subtracting a frequency signal consistent with frequency characteristics of the entry selected from the external apparatus output characteristic database 121 from the audio signal included in the voice section signal is executed.

According to this subtraction processing, the external apparatus output sound included in the voice section signal selected in step S405 is removed and, consequently, only a user spoken voice signal that does not include the external apparatus output sound is extracted.

In this manner, the user spoken voice signal is extracted by removing the external apparatus output sound from the voice section signal in step S406.

Next, frequency-time transformation processing, that is, inverse Fourier transform (inverse FT) is executed on a signal composed of only the user spoken voice signal in step S407. According to this processing, an output sound signal 331 composed of an audio signal corresponding to the user speech is generated.

In this manner, the user spoken voice extraction unit 112 executes signal processing on the input sound signal input to the audio input unit (microphone array) 105 of the information processing device 100 and executes processing of removing or reducing an external apparatus output sound from the input sound in which a user spoken voice and the external apparatus output sound are mixed to extract the output sound signal 331 composed of only the user spoken voice signal.

The user spoken voice signal (output sound signal 331) extracted by the user spoken voice extraction unit 112 is input to the audio recognition unit 113 of the data processing unit 110 of the information processing device 100.

The audio recognition unit 113 receives the clear user spoken voice signal from which the output sounds of the external apparatuses have been removed or reduced and executes user spoken voice recognition processing. Specifically, audio data may be converted into text data composed of a plurality of words according to the Automatic Speech Recognition (ASR) function, for example.

Meanwhile, audio recognition processing may be executed in an external server, that is, the data processing server 161 described with reference to FIG. 8, as described above.

In this case, the user spoken voice signal extracted by the user spoken voice extraction unit 112 is transmitted to the data processing server 161 and an audio recognition result is received from the data processing server 161.

An audio recognition processing result is output to the response processing unit 114. The response processing unit 114 receives the audio recognition processing result and generates a response (system speech) to the user with reference to the response processing data DB 122.

Response data generated by the response processing unit 114 is output through the audio output unit (speaker) 106 and the image output unit (display unit) 107.

Next, a processing example when an input sound of the audio input unit (microphone array) 105 includes only an external apparatus output sound without a user spoken voice will be described with reference to FIG. 16.

Signal processing illustrated in FIG. 16 is also executed by the user spoken voice extraction unit 112.

First, time-frequency transformation processing is executed on an input sound signal 351 input to the audio input unit (microphone array) 105 in step S401. Time-frequency transformation data by which an amplitude of a frequency component of each time unit can be analyzed is generated according to so-called Fourier transform (FT).

Meanwhile, in the present processing example, the input sound signal 351 does not include a user spoken voice and includes only an external apparatus output sound.

Next, sound source direction estimation processing is executed using the time-frequency transformation data in step S402. A sound source direction of the microphone input sound is calculated using the direction of arrival (DOA) estimation technique.

Next, a filter coefficient that is a parameter for performing beam forming (BF) processing that is signal processing of selecting and emphasizing a sound in the estimated sound source direction and noise reduction (NR) processing is calculated in step S403, and beam forming (BF) processing and noise reduction (NR) processing to which the calculated coefficient has been applied are executed in step S404.

Next, audio section detection processing is executed on the signal after beam forming (BF) and noise reduction (NR) processing in step S405.

This audio section detection processing may be, for example, processing using the conventional Voice Actovity Detection (VAD) technique and processing of determining a section including a voice and other sections, selecting and extracting a voice section signal of only the voice section.

Next, processing of removing the external apparatus output sound is executed on the selected and extracted voice section signal in step S406.

This external apparatus output sound removal processing is executed using information registered in the external apparatus output characteristic database 121.

First, an entry of an external apparatus corresponding to the sound source direction analyzed according to the sound source direction analysis result in step S402 is selected from information corresponding to a plurality of external apparatuses registered in the external apparatus output sound characteristic database 121. Further, a feature amount of the selected entry, for example, frequency characteristic information is acquired.

In step S406, processing of subtracting a frequency signal consistent with frequency characteristics of the entry selected from the external apparatus output characteristic database 121 from the audio signal included in the voice section signal is executed.

According to this subtraction processing, the external apparatus output sound included in the voice section signal selected in step S405 is removed.

In the present embodiment, since the input sound signal 351 includes only the external apparatus output sound and does not include a user spoken voice signal, the external apparatus output sound is removed in step S406 and thus a signal including little audio signal is generated.

Next, frequency-time transformation processing, that is, inverse Fourier transform (inverse FT) is executed on this signal in step S407. An output sound signal 361 generated according to this processing is an almost silence signal.

Although the signal extracted by the user spoken voice extraction unit 112 is input to the audio recognition unit 113 of the data processing unit 110 of the information processing device 100, the audio recognition unit 113 does not execute audio recognition processing on the almost silence input signal.

That is, in the information processing device 100 of the present disclosure, useless audio recognition is not performed on audio other than user speeches and thus unnecessary data processing is not executed.

7. Hardware Configuration Example of Information Processing Device

Next, a hardware configuration example of an information processing device will be described with reference to FIG. 17.

Figure 17:
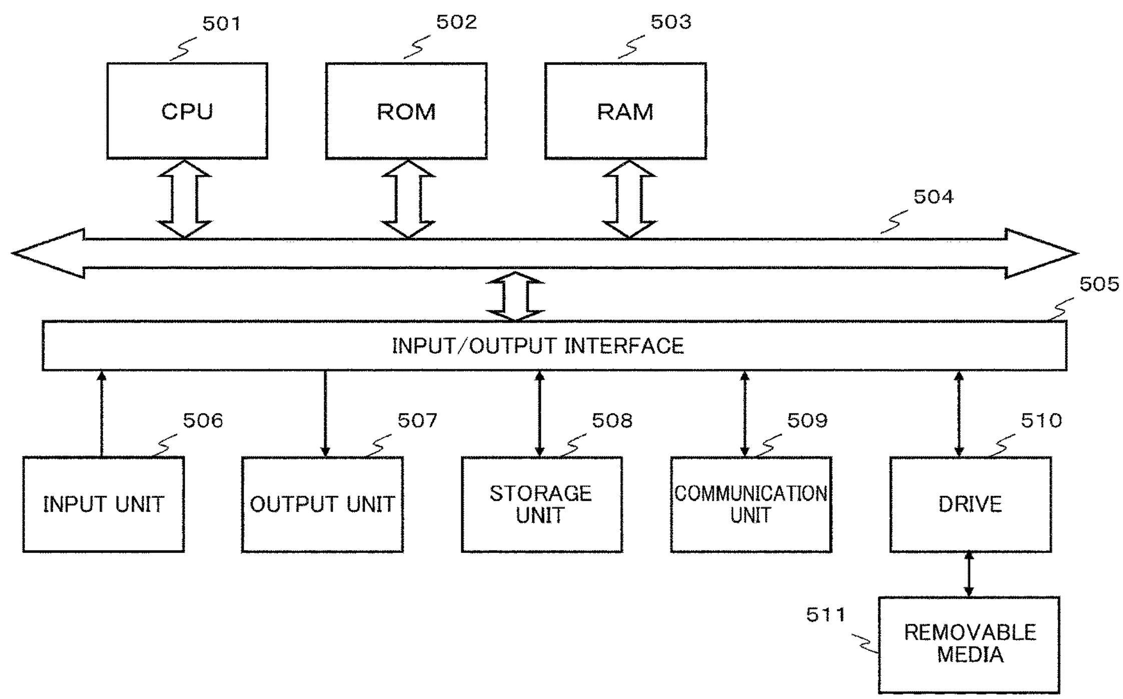
FIG. 17 is a diagram illustrating a hardware configuration example of the information processing device.

Hardware described with reference to FIG. 17 is a hardware configuration example of the information processing device described above with reference to FIG. 8.

A central processing unit (CPU) 501 serves as a control unit and a data processing unit that execute various types of processing according to a program stored in a read only memory (ROM) 502 or a storage unit 508. For example, the CPU 501 executes processing according to the sequences described in the above-described embodiment. Programs executed by the CPU 501, data, and the like are stored in a random access memory (RAM) 503. The CPU 501, the ROM 502, and the RAM 503 are connected through a bus 504.

The CPU 501 is connected to an input/output interface 505 through the bus 504, and an input unit 506 including various switches, a keyboard, a mouse, a microphone, a sensor, and the like, and an output unit 507 including a display, a speaker, and the like are connected to the input/output interface 505. The CPU 501 executes various types of processing corresponding to instructions input through the input unit 506 and outputs processing results, for example, to the output unit 507.

The storage unit 508 connected to the input/output interface 505 may be composed of, for example, a hard disk and the like, and store programs executed by the CPU 501 and various types of data. A communication unit 509 serves as a transmission/reception unit for Wi-Fi communication, Bluetooth (registered trademark) communication, and data communication through networks such as the Internet and a local area network and communicates with external devices.

A drive 510 connected to the input/output interface 505 drives removable media 511 such as a magnetic disc, an optical disc, a magneto-optical disc, and a semiconductor memory such as a memory card and executes recording or reading of data.

8. Summary of Configuration of Present Disclosure

Embodiments of the present disclosure have been described above in detail with reference to a specific embodiment. However, it will be apparent to those skilled in the art that modification and substation of the embodiments can be made without departing from the gist of the technology disclosed in the present disclosure. That is, the present invention has been disclosed according to an illustrative form, but the present disclosure should not be restrictively construed. The gist of the present disclosure should be determined in consideration of the claims.

Meanwhile, the technology disclosed in the present description may also be configured as follows.

(1) An information processing device including a user spoken voice extraction unit configured to extract a user spoken voice from a sound input through an audio input unit, wherein the user spoken voice extraction unit analyzes a sound source direction of the input sound and executes processing of determining whether the input sound includes an external apparatus output sound on the basis of sound source directions of external apparatus output sounds recorded in an external apparatus output sound characteristic database and removing the external apparatus output sound from the input sound using a feature amount of the external apparatus output sound recorded in the external apparatus output sound characteristic database when it is determined that the input sound includes the external apparatus output sound.

(2) The information processing device according to (1), wherein the user spoken voice extraction unit determines that the input sound includes the external apparatus output sound when a sound source direction of the external apparatus output sound recorded in the external apparatus output sound characteristic database is consistent with or similar to the sound source direction of the input sound.

(3) The information processing device according to (1) or (2), wherein the user spoken voice extraction unit executes beam forming processing that is signal processing of selecting and emphasizing a sound in the analyzed sound source direction after analyzing the sound source direction of the input sound.

(4) The information processing device according to any one of (1) to (3), wherein the user spoken voice extraction unit executes processing of subtracting the external apparatus output sound from the input sound using the feature amount of the external apparatus output sound recorded in the external apparatus output sound characteristic database to extract a user spoken voice.

(5) The information processing device according to any one of (1) to (4), wherein sound source directions of external apparatus output sounds and frequency characteristics that are feature amounts are recorded in the external apparatus output sound characteristic database, and wherein the user spoken voice extraction unit executes processing of acquiring a frequency characteristic of the external apparatus output sound from the external apparatus output sound characteristic database and subtracting a sound signal corresponding to the acquired frequency characteristic from the input sound.

(6) The information processing device according to any one of (1) to (5), wherein sound source directions of external apparatus output sounds and external apparatus speech text information that is a feature amount are recorded in the external apparatus output sound characteristic database, and wherein the user spoken voice extraction unit acquires external apparatus speech text information from the external apparatus output sound characteristic database and determines that the input sound includes the external apparatus output sound when the acquired external apparatus speech text information is consistent with a result of audio recognition of the input sound.

(7) The information processing device according to any one of (1) to (6), wherein the user spoken voice extraction unit executes voice section detection processing on the input sound and executes processing of removing the external apparatus output sound using processing target data as voice section data.

(8) An information processing device including an external apparatus output sound analysis unit configured to analyze a characteristic of an output sound of an external apparatus and to record the analyzed characteristic in a database, wherein the external apparatus output sound analysis unit causes audio data having a known frequency characteristic to be output from the external apparatus, receives a sound signal acquired by a microphone array, and executes analysis of the input sound signal to analyze a sound source direction of the external apparatus and a frequency characteristic of the external apparatus output sound.

(9) The information processing device according to (8), wherein the external apparatus output sound analysis unit analyzes frequency characteristics including the influence of a transfer characteristic of an indoor space in which the external apparatus and the information processing device are placed.

(10) The information processing device according to (8) or (9), wherein the frequency characteristic of the external apparatus acquired by the external apparatus output sound analysis unit is a frequency characteristic according to the following formula:

external apparatus frequency characteristic=(frequency characteristic of observation signal acquired by microphone array)−(frequency characteristic of reproduced audio data).

(11) The information processing device according any one of (8) to (10), wherein the external apparatus output sound analysis unit executes beam forming processing that is signal processing of selecting and emphasizing a sound in the analyzed sound source direction to analyze the frequency characteristic of the external apparatus output sound after analyzing the sound source direction of the input sound.

(12) The information processing device according any one of (8) to (11), wherein the external apparatus output sound analysis unit analyzes frequency characteristics in units of sound acquired by each microphone constituting the microphone array.

(13) An information processing method executed in an information processing device, wherein the information processing device includes a user spoken voice extraction unit configured to extract a user spoken voice from a sound input through an audio input unit, and wherein the user spoken voice extraction unit analyzes a sound source direction of the input sound and executes processing of determining whether the input sound includes an external apparatus output sound on the basis of sound source directions of external apparatus output sounds recorded in an external apparatus output sound characteristic database and removing the external apparatus output sound from the input sound using a feature amount of the external apparatus output sound recorded in the external apparatus output sound characteristic database when it is determined that the input sound includes the external apparatus output sound.

(14) An information processing method executed in an information processing device, wherein the information processing device includes an external apparatus output sound analysis unit configured to analyze a characteristic of an output sound of an external apparatus and to record the analyzed characteristic in a database, and wherein the external apparatus output sound analysis unit causes audio data having a known frequency characteristic to be output from the external apparatus, receives a sound signal acquired by a microphone array, and executes analysis of the input sound signal to analyze a sound source direction of the external apparatus and a frequency characteristic of the external apparatus output sound.

(15) A program causing information processing to be executed in an information processing device, wherein the information processing device includes a user spoken voice extraction unit configured to extract a user spoken voice from a sound input through an audio input unit, and wherein the program causes the user spoken voice extraction unit to analyze a sound source direction of the input sound, and to execute processing of determining whether the input sound includes an external apparatus output sound on the basis of sound source directions of external apparatus output sounds recorded in an external apparatus output sound characteristic database and removing the external apparatus output sound from the input sound using a feature amount of the external apparatus output sound recorded in the external apparatus output sound characteristic database when it is determined that the input sound includes the external apparatus output sound.

(16) A program causing information processing to be executed in an information processing device, wherein the information processing device includes an external apparatus output sound analysis unit configured to analyze a characteristic of an output sound of an external apparatus and to record the analyzed characteristic in a database, and wherein the program causes the external apparatus output sound analysis unit to cause audio data having a known frequency characteristic to be output from the external apparatus, to receive a sound signal acquired by a microphone array, and to execute analysis of the input sound signal to analyze a sound source direction of the external apparatus and a frequency characteristic of the external apparatus output sound.

In addition, a series of processing described in the description can be executed by hardware, software, or a combination thereof. When processing according to software is executed, a program in which a processing sequence has been recorded can be installed in a memory in a computer incorporated in dedicated hardware and executed or installed in a general-purpose computer capable of executing various types of processing and executed. For example, the program can be recorded in a recording medium in advance. In addition to installation of the program in a computer from a recording medium, the program can be received through a network such as a local area network (LAN) and the Internet and installed in a recording medium such as an embedded hard disk.

Further, various types of processing described in the description may be not only chronologically executed according to description but also executed in parallel or individually according to processing capability of a device that execute the processing or as necessary. In addition, in the present description, a system is a set of logical components of a plurality of devices and it does not matter whether or not all the components are arranged in a single housing.

INDUSTRIAL APPLICABILITY

As described above, according to a configuration of an embodiment of the present disclosure, a device and a method capable of performing audio recognition based on clear user speech by removing an external apparatus output sound from audio input through the audio input unit are realized.

Specifically, for example, a user spoken voice extraction unit that extracts a user spoken voice from a microphone input sound is included. The user spoken voice extraction unit analyzes a sound source direction of an input sound, determines whether the input sound includes an external apparatus output sound on the basis of sound source directions of external apparatus output sounds recorded in a database, and removes a sound signal corresponding to a feature amount, for example, a frequency characteristic of the external apparatus output sound recorded in the database, from the input sound to extract a user spoken voice from which the external apparatus output sound has been removed upon determining that the input sound includes the external apparatus output sound.

According to this configuration, a device and a method capable of performing audio recognition based on clear user speech by removing an external apparatus output sound from audio input through an audio input unit are realized.

REFERENCE SIGNS LIST

10 Information processing device
11 Microphone (array)
12 Display unit
13 Speaker
31 Television set
32 Radio receiver
33 Refrigerator
34 Rice cooker
100 Information processing device
101 Control unit
102 Storage unit
103 Communication unit
105 Audio input unit (microphone array)
106 Audio output unit (speaker)
107 Image output unit (display unit)
110 Data processing unit
111 External apparatus output sound analysis unit
112 User spoken voice extraction unit
113 Audio recognition unit
114 Response processing unit
121 External apparatus output sound DB
122 Response processing data DB
150 External apparatus
151 Control unit
152 Audio output unit
153 Communication unit
161 Data processing server
162 External apparatus information providing server
501 CPU
502 ROM
503 RAM
504 Bus
505 Input/output interface
506 Input unit
507 Output unit
508 Storage unit
509 Communication unit
510 Drive
511 Removable media

The invention claimed is:

1. An information processing device, comprising:

an external apparatus output sound characteristic database that includes sound source directions of a plurality of external apparatus output sounds, wherein each sound source direction of the sound source directions corresponds to a respective external apparatus output sound of the plurality of external apparatus output sounds; and a central processing unit (CPU) configured to:

analyze a plurality of characteristics of an external apparatus output sound of an external apparatus, wherein the plurality of characteristics of the external apparatus output sound includes a first sound source direction of the external apparatus output sound and a first frequency characteristic of the external apparatus output sound, the plurality of external apparatus output sounds includes the external apparatus output sound, and the sound source directions include the first sound source direction;

record the analyzed plurality of characteristics of the external apparatus output sound in the external apparatus output sound characteristic database;

cause output of audio data having a second frequency characteristic from the external apparatus;

receive an input sound that is acquired by a microphone array;

execute analysis of the input sound; and analyze, based on the executed analysis of the input sound, a second sound source direction of the input sound and a third frequency characteristic of the input sound, wherein the sound source directions include the second sound source direction;

extract a user spoken voice from the input sound acquired by the microphone array;

determine that the input sound includes the external apparatus output sound based on the sound source directions of the plurality of external apparatus output sounds; and remove the external apparatus output sound from the input sound based on a feature amount of the external apparatus output sound recorded in the external apparatus output sound characteristic database, and the determination that the input sound includes the external apparatus output sound.

2. The information processing device according to claim 1, wherein the CPU is further configured to:

determine that a specific sound source direction, of the sound source directions, is one of consistent with or similar to the second sound source direction of the input sound; and determine that the input sound includes the external apparatus output sound based on the determination that the specific sound source direction is the one of consistent with or similar to the second sound source direction of the input sound.

3. The information processing device according to claim 1, wherein the CPU is further configured to execute beam forming processing after the analysis of the second sound source direction of the input sound, and the beam forming processing is signal processing to select and emphasize a specific sound in the analyzed second sound source direction.

4. The information processing device according to claim 1, wherein the CPU is further configured to perform subtraction of the external apparatus output sound from the input sound using the feature amount of the external apparatus output sound, the extraction of the user spoken voice is based on the subtraction, and the external apparatus output sound characteristic database further includes the feature amount of the external apparatus output sound.

5. The information processing device according to claim 1, wherein the external apparatus output sound characteristic database further includes a plurality of frequency characteristics of the plurality of external apparatus output sounds, the plurality of frequency characteristics includes the first frequency characteristic, the second frequency characteristic, and the third frequency characteristic, each frequency characteristic of the plurality of frequency characteristics corresponds to a respective external apparatus output sound of the plurality of external apparatus output sounds, the sound source directions and the plurality of frequency characteristics are feature amounts, the feature amounts include the feature amount of the external apparatus output sound, and the CPU is further configured to:

acquire the first frequency characteristic of the external apparatus output sound from the external apparatus output sound characteristic database; and subtract a sound signal corresponding to the acquired first frequency characteristic from the input sound.

6. The information processing device according to claim 1, wherein the external apparatus output sound characteristic database further includes external apparatus speech text information, the external apparatus speech text information is the feature amount of the external apparatus output sound, and the CPU is further configured to:

acquire the external apparatus speech text information from the external apparatus output sound characteristic database;

determine that the acquired external apparatus speech text information is consistent with a result of audio recognition of the input sound; and determine that the input sound includes the external apparatus output sound based on the determination that the acquired external apparatus speech text information is consistent with the result of audio recognition of the input sound.

7. The information processing device according to claim 1, wherein the CPU is further configured to:

execute voice section detection processing on the input sound; and remove the external apparatus output sound based on the executed voice section detection processing.

8. The information processing device according to claim 1, wherein the CPU is further configured to analyze a plurality of frequency characteristics of the external apparatus output sound, the plurality of frequency characteristics includes the first frequency characteristic, the plurality of frequency characteristics includes a transfer characteristic of an indoor space, and the indoor space includes the external apparatus and the information processing device.

9. The information processing device according to claim 1, wherein the third frequency characteristic of the input sound is based on the following formula:

external apparatus frequency characteristic=(frequency characteristic of observation signal acquired by the microphone array)−(frequency characteristic of reproduced audio data).

10. The information processing device according to claim 1, wherein the CPU is further configured to execute beam forming processing after the analysis of the second sound source direction of the input sound, and the beam forming processing is signal processing to select and emphasize a specific sound in the analyzed second sound source direction to analyze the first frequency characteristic of the external apparatus output sound.

11. The information processing device according to claim 1, wherein the CPU is further configured to analyze a plurality of frequency characteristics of the input sound in units of sound acquired by each microphone constituting the microphone array, and the plurality of frequency characteristics of the input sound includes the third frequency characteristic of the input sound.

12. A non-transitory computer-readable medium having stored thereon, computer executable instructions, which when executed by a computer, cause the computer to execute operations, the operations comprising:

analyzing a plurality of characteristics of an external apparatus output sound of an external apparatus, wherein the plurality of characteristics of the external apparatus output sound includes a first sound source direction of the external apparatus output sound and a first frequency characteristic of the external apparatus output sound;

recording the analyzed plurality of characteristics of the external apparatus output sound in an external apparatus output sound characteristic database, wherein the external apparatus output sound characteristic database includes sound source directions of a plurality of external apparatus output sounds, each sound source direction of the sound source directions corresponds to a respective external apparatus output sound of the plurality of external apparatus output sounds, the plurality of external apparatus output sounds includes the external apparatus output sound, and the sound source directions include the first sound source direction;

causing output of audio data having a second frequency characteristic from the external apparatus;

receiving an input sound that is acquired by a microphone array;

executing analysis of the input sound; and analysing, based on the executed analysis of the input sound, a second sound source direction of the input sound and a third frequency characteristic of the input sound, wherein the sound source directions include the second sound source direction;

extracting a user spoken voice from the input sound acquired by the microphone array;

determining the input sound includes the external apparatus output sound based on the sound source directions of the plurality of external apparatus output sounds; and removing the external apparatus output sound from the input sound based on a feature amount of the external apparatus output sound recorded in the external apparatus output sound characteristic database, and the determination that the input sound includes the external apparatus output sound.

13. An information processing method, comprising:

analyzing a plurality of characteristics of an external apparatus output sound of an external apparatus, wherein the plurality of characteristics of the external apparatus output sound includes a first sound source direction of the external apparatus output sound and a first frequency characteristic of the external apparatus output sound;

recording the analyzed plurality of characteristics of the external apparatus output sound in an external apparatus output sound characteristic database, wherein the external apparatus output sound characteristic database includes sound source directions of a plurality of external apparatus output sounds, each sound source direction of the sound source directions corresponds to a respective external apparatus output sound of the plurality of external apparatus output sounds, the plurality of external apparatus output sounds includes the external apparatus output sound, and the sound source directions include the first sound source direction;

causing output of audio data having a second frequency characteristic from the external apparatus;

receiving an input sound that is acquired by a microphone array;

executing analysis of the input sound; and analysing, based on the executed analysis of the input sound, a second sound source direction of the input sound and a third frequency characteristic of the input sound, wherein the sound source directions include the second sound source direction;

extracting a user spoken voice from the input sound acquired by the microphone array;

determining the input sound includes the external apparatus output sound based on the sound source directions of the plurality of external apparatus output sounds; and removing the external apparatus output sound from the input sound based on a feature amount of the external apparatus output sound recorded in the external apparatus output sound characteristic database, and the determination that the input sound includes the external apparatus output sound.

* * * * *